United States Patent [19]

Rosenbrock et al.

[11] Patent Number: 5,253,564
[45] Date of Patent: Oct. 19, 1993

[54] CONVEYOR OVEN CONTROL

[75] Inventors: Richard Rosenbrock, Bluffton, Ind.; William S. Schjerven, Sr., Schaumburg; Ralph A. Chrzastek, Warrenville, both of Ill.

[73] Assignee: The Middleby Corporation, Rosemont, Ill.

[21] Appl. No.: 940,791

[22] Filed: Sep. 4, 1992

Related U.S. Application Data

[63] Continuation of Ser. No. 753,426, Aug. 30, 1991, Pat. No. 5,197,375.

[51] Int. Cl.$^5$ .......................... A21B 1/40; A21B 1/42; H05B 1/02
[52] U.S. Cl. ...................................... 99/328; 99/326; 99/335; 99/386; 99/443 C
[58] Field of Search ....................... 99/325-328, 99/329 R, 331-335, 386, 423, 427, 443 R, 443 C, 477, 468, 486; 219/388, 494, 495, 412, 492; 364/557, 569, 400; 126/21 A, 21 R

[56] References Cited

U.S. PATENT DOCUMENTS

| | | | |
|---|---|---|---|
| 4,252,055 | 2/1981 | Johansson et al. | 99/443 C |
| 4,389,562 | 6/1983 | Chaudoir | 219/388 |
| 4,554,437 | 11/1985 | Wagner et al. | 99/443 C |
| 4,591,333 | 5/1986 | Henke | 99/386 |
| 4,615,014 | 9/1986 | Gigandet et al. | 364/557 |
| 4,644,857 | 2/1987 | Buller-Colthurst | 99/335 |
| 4,716,820 | 1/1988 | Stuck | 126/21 A |
| 4,914,277 | 4/1990 | Guerin et al. | 99/325 |
| 4,951,648 | 8/1990 | Shukla et al. | 99/331 |
| 4,964,392 | 10/1990 | Bruno et al. | 99/443 C |
| 4,965,435 | 10/1990 | Smith et al. | 219/388 |

*Primary Examiner*—Timothy F. Simone
*Attorney, Agent, or Firm*—Laff, Whitesel, Conte & Saret

[57] ABSTRACT

A control device for a multi-zone conveyor oven constructed according to the present invention comprises a microprocessor-based controller, appropriate control software, a keyboard and display for interaction with a user, means for sensing the conveyor speed and the heating chamber temperature, and means for controlling the power supplied to the conveyor motor and the heating elements. The controller provides facilities for user programming of sets of oven parameters, each set corresponding to a particular food product to be cooked in the oven. Each set of parameters includes the total cook time for the product and a desired temperature which is independently selectable for each heating zone. Once a set of parameters has been programmed, it is assigned to a particular key on the keyboard, and the user may select that entire set of parameters by simply pushing the assigned key. The parameters are stored in the EEPROM to prevent their loss during electrical power interruptions. High-accuracy, low hysteresis temperature control of the oven is provided by pulse-width-modulating the power supplied to the heating elements. Accurate and repeatable control of cooking time is provided by controlling the speed of the motor driving the product transport conveyor. Such control is provided by pulse-width-modulating the power supplied to the motor according to motor speed information derived by sensing the motor shaft position. The controller also provides extensive fault detection, and degrades oven performance as gracefully as possible.

17 Claims, 18 Drawing Sheets

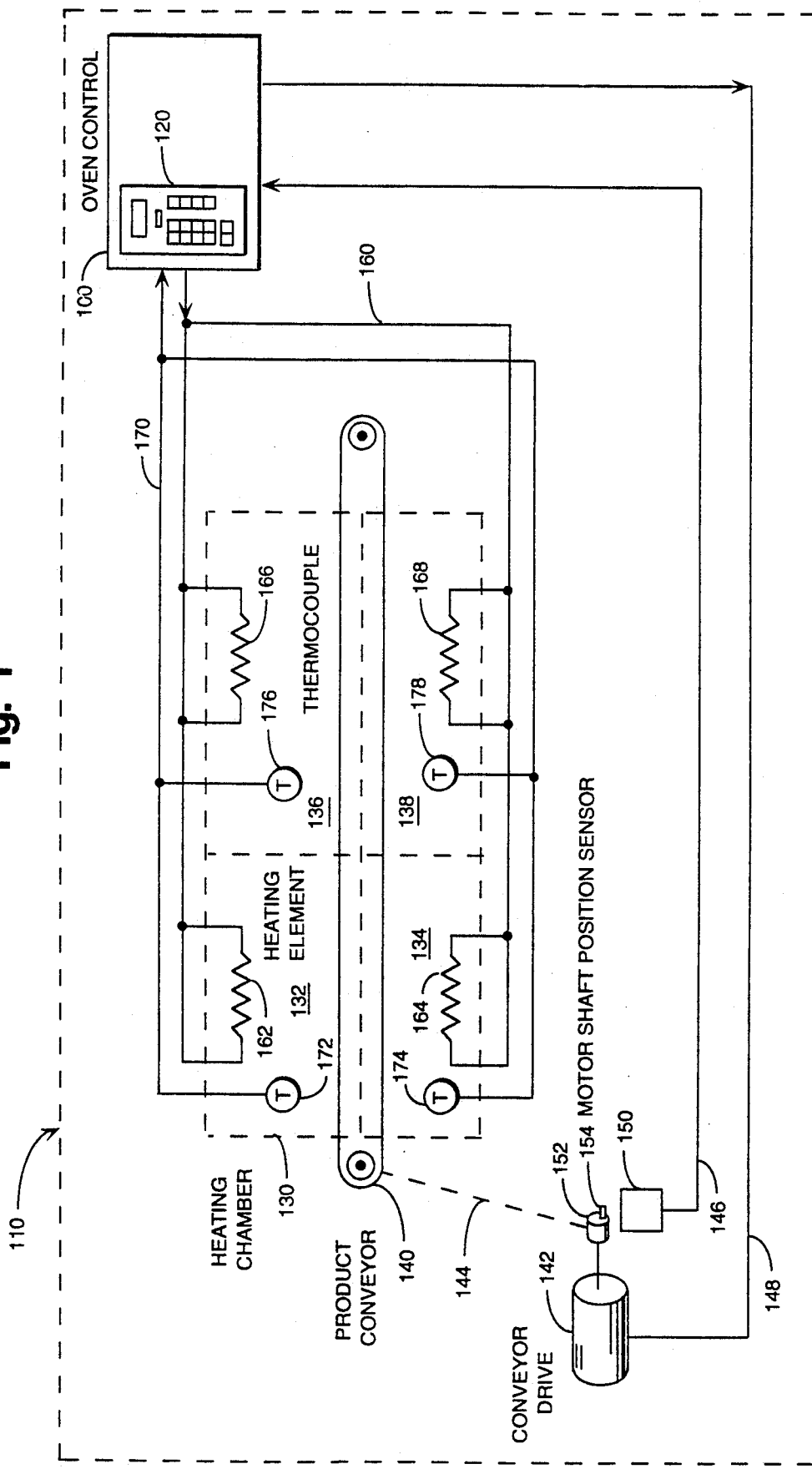

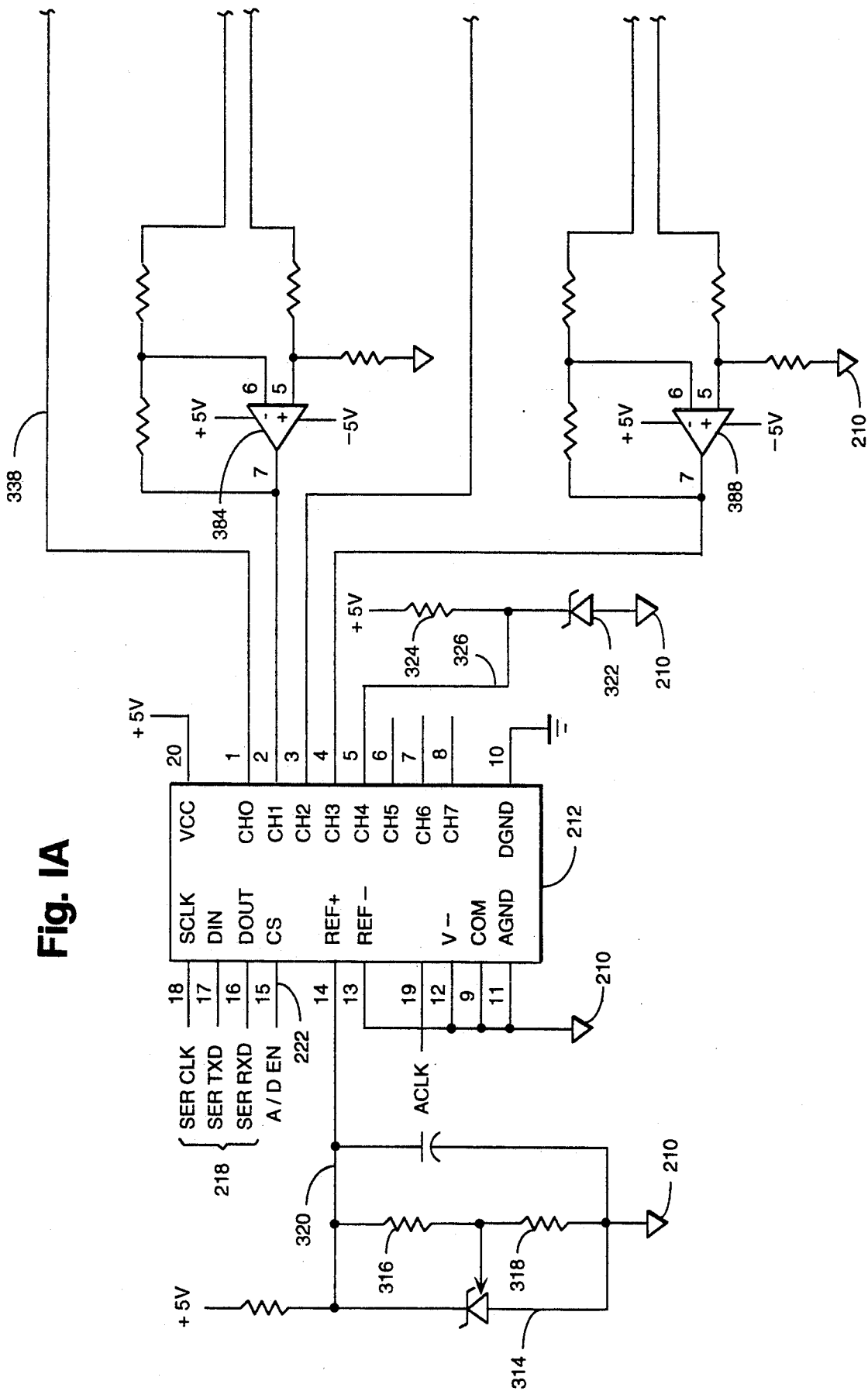
Fig. IA

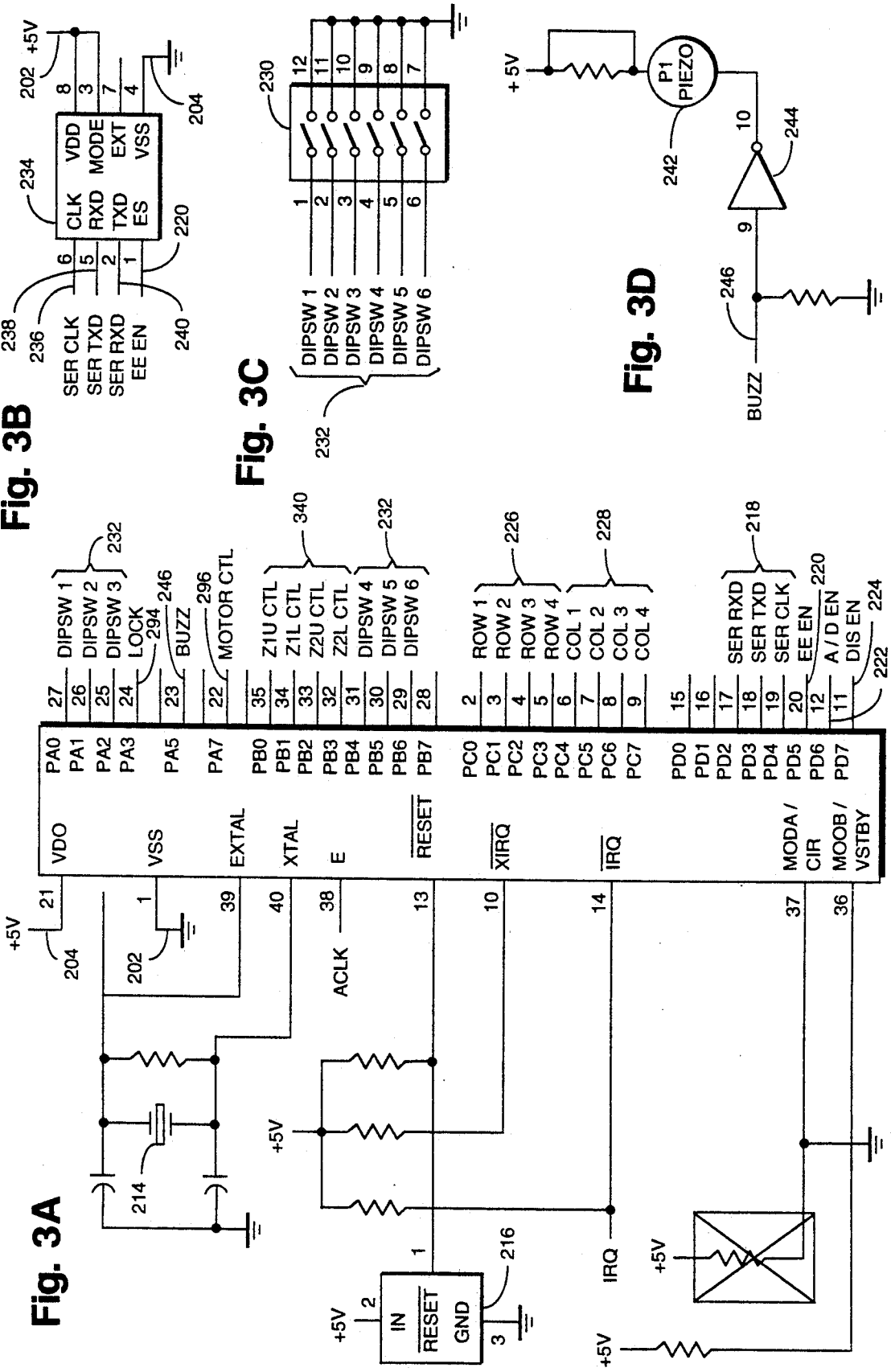

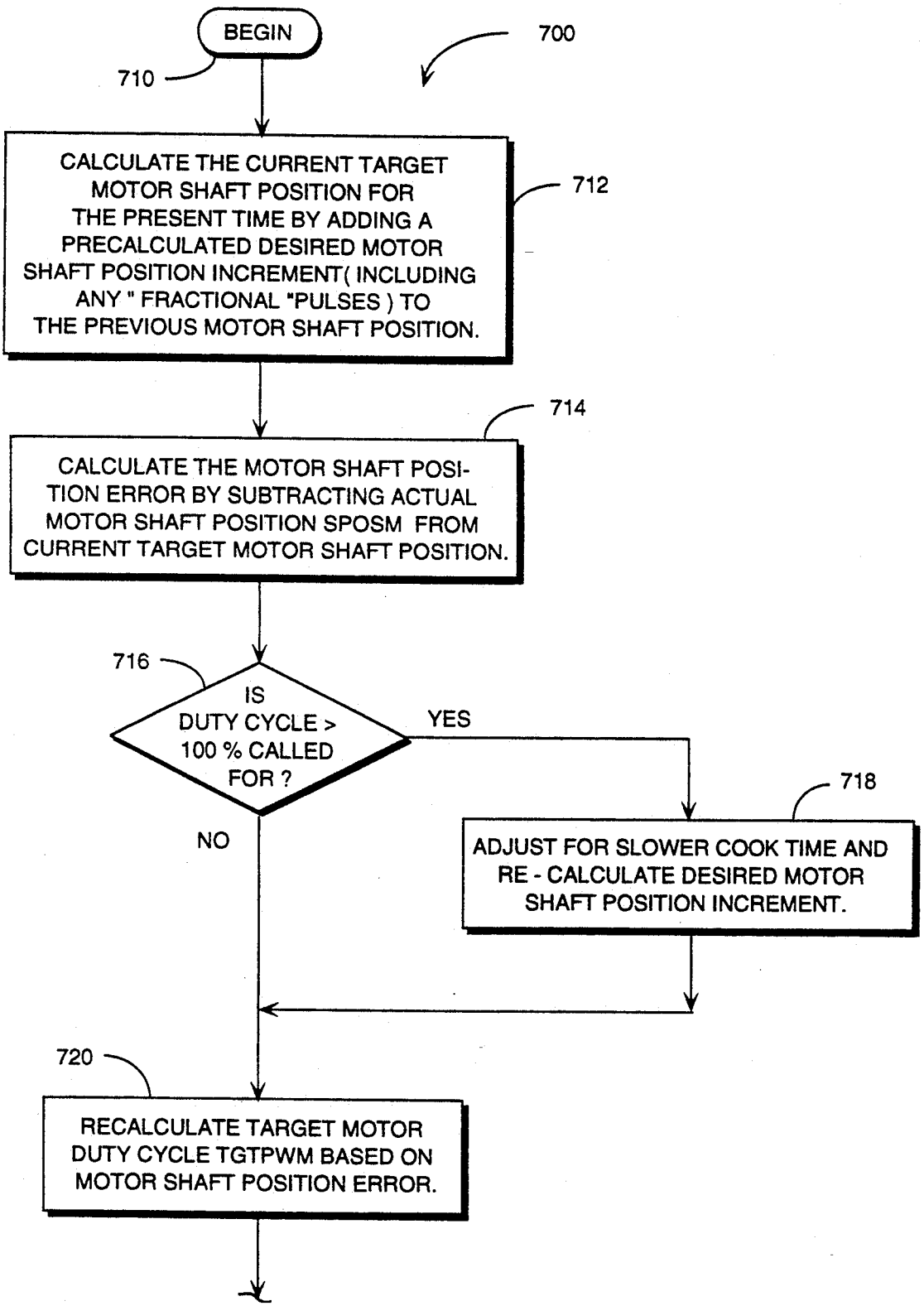

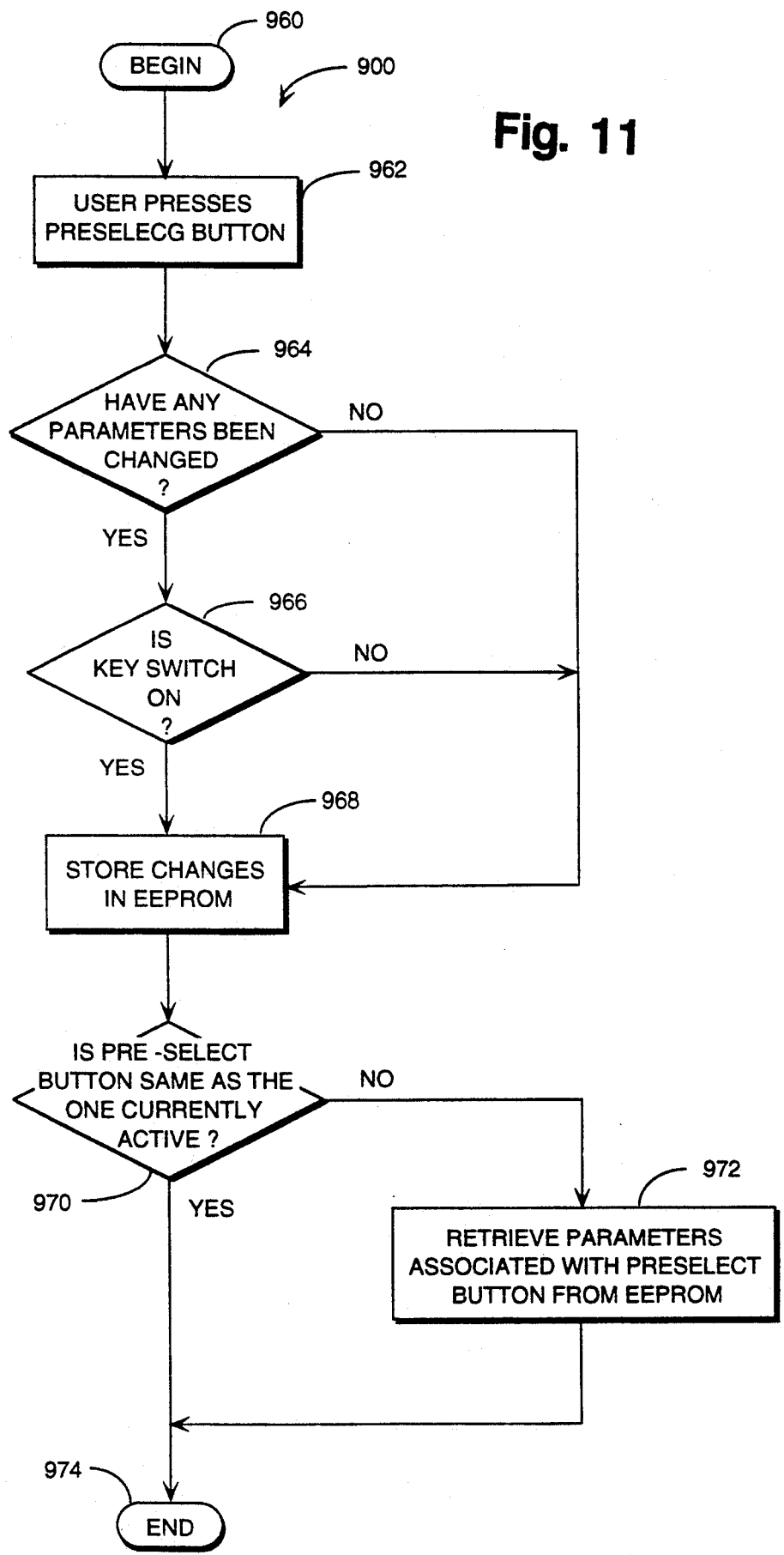

CONVEYOR OVEN CONTROL

This application is a continuation of prior application Ser. No. 07/753,426 filed Aug. 30, 1991, now U.S. Pat. No. 5,197,375.

REFERENCE TO MICROFICHE APPENDIX

A microfiche appendix to this patent application, comprising one sheet of microfiche, contains 67 frames of computer program listings illustrating a preferred embodiment of the control software contemplated by the invention disclosed below.

BACKGROUND OF THE INVENTION

This invention relates to conveyor ovens, and more particularly to devices for regulating the temperature and product transport speed in the conveyor type ovens typically used in food service and food product manufacturing applications.

Conveyor ovens are used in those applications which require that a relatively large volume of food be cooked at consistently controllable times and temperatures. A conveyor oven typically comprises a substantially enclosed heating chamber for cooking a food product at controlled temperatures, and a conveyor for transporting the food product through the heating chamber.

It may be desirable to cook the upper portion or surface of the product at a temperature different from that of the lower portion or surface. It may also be desirable to cook the product at different temperatures during portions of the cooking cycle. Accordingly, manufacturers of conveyor ovens now provide ovens having multiple heating zones. At least one heating element is provided for each heating zone, and the elements within each zone may operate at a temperature which is selected independently of the other zones.

Such an oven typically has a control device which permits the user to select the temperatures for each zone and the speed at which the product is transported through the oven. Since the mechanical configuration of the heating elements remains constant, the product transport speed determines the length of time the product remains within each heating zone, and therefore controls the cooking time of the product.

The practical use of multiple-zone conveyor ovens presents a variety of significant control problems. In a commercial environment, it is especially important to be able to rapidly modify the oven's operating parameters so that different products may be prepared without a substantial setup time between products. For example, where a conveyor oven is used in a convenience store application to cook several types or sizes of food products for immediate service to a retail customer, it is essential that the oven's operating parameters may be changed to accommodate the next product immediately after the oven has finished cooking the previous product.

Existing conveyer ovens of which we are aware are equipped with control devices which require the user to individually adjust the operating set-points of the oven, such as the temperature of each zone and the product cooking time, whenever it is desired to change the parameters. For ovens having multiple zones, a relatively large number of set-point adjustments is required. As a result, an unreasonably large amount of time must be spent in adjusting the oven between products. This requirement is particularly troublesome in high-demand retail applications, such as convenience stores, where it reduces the throughput of the oven and also distracts the store clerk from other customer service duties.

In addition, because it may be desirable to cook a variety of products in the oven, it is necessary for the user to remember or to ascertain, the various oven operating parameters in order to adjust the set-points each time a different product is cooked. The set-points are typically expressed as numerical cook-time and temperature settings. Adjusting the set-points tends to be a difficult and error-prone process. The clerk may not understand the cooking instructions provided with the product, or may have difficulty translating that information into proper oven settings. Errors in the set-points typically result in improperly cooked food, and may even present safety problems, because food cooked at too high a temperature or for an excessive time may catch fire.

Because of these problems, some oven users choose to run the oven at a single consistent group or "recipe" of operating parameters all the time, regardless of the requirements of each food product cooked in the oven. For items which require more cooking than that provided in a single oven cycle, the user must cook the product through several cycles. This practice also typically results in improperly cooked food. In addition, this practice prevents optimal oven utilization, reducing oven throughput, increasing customer wait times, and increasing oven energy use.

Another problem associated with prior-art conveyor ovens relates to controlling the oven temperature developed by the heating elements. Conventional oven control systems included a user-adjustable thermostat device for regulating the temperature provided by the heating elements. The conventional thermostat measures the temperature in a selected region of the heating chamber and activates the heating elements whenever the measured temperature is below a user-adjusted predetermined temperature. Once the elements are activated, they produce heat and the temperature in the heating chamber begins to rise. After the measured temperature has risen a predefined amount above the activation temperature, the thermostat deactivates the elements. The predefined difference between the heating element activation and deactivation temperatures is referred to as hysteresis.

Because the heating elements are electrically operated, their activation and deactivation have been conventionally controlled using mechanical contacts which supplied electrical power to the elements. Mechanical contacts of this type are inherently slow, and subject to wear upon each operation. Accordingly, it has been generally preferred in the prior art to construct thermostats which provide substantial amounts of hysteresis between the heating element activation and deactivation temperatures, typically amounting to several degrees F., in order to reduce the frequency of operation of the contacts. Although this practice reduces contact wear and thus promotes reliability of the thermostat, it significantly increases the temperature excursions of the heating elements, which causes undesirable expansion and contraction of the heater elements themselves and also of other oven components. In addition, the substantial variations in heater element output and heating chamber temperature cause inconsistencies in cooking performance.

Yet another problem associated with prior-art ovens is accurate cook-time control. In order to accommodate the cooking of various food products, the cook-time must be user-selectable. In order to produce consistent cooking results for a particular product, the total cook-time must remain consistent each time that product is cooked. In multi-zone ovens, it is also necessary for each product to remain in each of the respective cooking zones for the same lengths of time on each cooking occasion. Prior-art conveyor ovens of which we are aware have generally not provided a user-adjustable cook time control which is sufficiently accurate and repeatable to satisfy these requirements.

In some prior-art ovens, cook time is controlled by a user-adjustable timer which simply enables the heating elements at the beginning of a cooking cycle, and disables the heating elements when the desired cook-time has elapsed. In such ovens, the cook-time is not directly related to the conveyor speed, but the conveyor speed need not be accurately controlled so long as the conveyor moves slowly enough that the product remains within the heating chamber for the entire cooking period. This method of controlling cook-time works poorly for multiple-zone ovens, however, because a single timer will not properly determine the length of time the product spends in each of the respective heating zones.

In other prior-art ovens, the heating elements are constantly enabled, and therefore the product is subject to cooking temperatures whenever it is within the heating chamber. Thus, the cook-time is controlled by varying the speed of the product transport conveyor. Such ovens may allow a user to select either a particular conveyor speed or a cook-time from which the controller determines the appropriate conveyor speed. A significant problem with such prior-art ovens is that it is difficult to accurately and repeatably control the conveyor speed over a wide variety of desired cook-times, power supply voltages, and conveyor loading factors.

The speed control problem is particularly great where long cook-times are desired, because long cook-times necessitate exceedingly slow conveyor speeds. The product transport conveyers in most conveyor ovens are driven by electric motors, and thus slow conveyor speeds require correspondingly slow motor speeds. Motor speed control methods used in prior-art conveyor ovens operate poorly at such low motor speeds, in part because at low speeds the effects of friction, conveyor loading, and other mechanical factors are maximized.

Another problem associated with prior-art conveyor speed controls is their inability to operate with a wide variety of oven configurations due to the differences in the motor types, conveyor drive gear ratios, and heating chamber lengths which are used in these ovens. Each of the prior-art conveyor speed control methods of which we are aware is designed for use with a particular combination of these parameters. Accordingly, substantial recalibration or modification of prior-art controls is required in order to make them compatible with a different motor, conveyor drive gear ratio, or heating chamber length. This increases maintenance costs, because a variety of control models must be stocked to accommodate various in oven configurations.

Another disadvantage of prior-art conveyor oven controls is inadequate fault detection and lack of tolerance for non-catastrophic fault conditions. When a fault occurs in an oven, it is essential that the fault be detected and the oven shut down if the fault presents a safety hazard. When the fault has no safety implications, however, it is desirable that the oven continue to operate if possible, even with some reduction in performance, until the oven can be repaired. Prior-art controllers generally have limited fault detection and handling capabilities. Some controllers do not even detect catastrophic faults, and therefore may be hazardous. Other controllers detect a wider variety of faults, but do not permit continued oven operation for non-safety-related faults.

OBJECTS AND SUMMARY OF THE INVENTION

It is therefore an object of the present invention to provide a conveyor oven control which permits rapid selection of predefined oven operating parameters corresponding to the cooking requirements of a particular product.

It is another object of the invention to provide a conveyor oven control which accurately maintains the heating chamber at a user-selectable temperature and has low hysteresis to minimize excursions from the desired temperature.

It is another object of the invention to provide a control for multizone conveyor ovens which accurately and repeatably controls the speed of the product transport conveyor to provide consistent product cook-times in each zone.

It is another object of the invention to provide a control for multizone conveyor ovens which is adaptable to control the product transport conveyor for a variety of oven configurations with only minimal adjustment.

It is a further object of the invention to provide a conveyor oven control which detects commonly occurring faults and takes appropriate action to evade the fault, thereby providing graceful degradation of oven performance where possible.

A control device for a multizone conveyor oven constructed according to the present invention comprises a microprocessor-based controller, appropriate control software, a keyboard and display for interaction with a user, means for sensing the conveyor speed and the heating chamber temperature, and means for controlling the power supplied to the conveyor motor and the heating elements.

The controller comprises a conventional microcomputer unit having a central processing unit, a ROM or EPROM for program storage, a RAM for temporary storage, a counter-timer device, a variety of interface lines for exchanging information with external devices, and a serial peripheral interface bus for exchanging information with certain peripheral devices. An analog-to-digital converter receives temperature-indicating signals from thermocouples in the heating chamber and converts these signals into data usable by the microcomputer. A Hall-effect sensor detects the position of the conveyor motor shaft and provides this information to the microcomputer. An electrically-erasable programmable read only memory (EEPROM) stores user-programmed oven parameters and other information despite interruptions in the electrical power supply to the oven. A suitable display controller is used to interface the display devices to the microcomputer.

The controller provides facilities for user programming of sets of oven parameters, each set corresponding to a particular food product to be cooked in the oven. Each set of parameters includes the desired temperature for each heating zone and the total cook-time for the product. Once a set of parameters has been programmed, it is assigned to a predefined key on the keyboard, and the user may select that set of parameters by simply pushing the assigned key. The parameters are stored in the EEPROM to prevent their loss during electrical power interruptions.

High-accuracy, low hysteresis temperature control of the oven is provided by pulse-width-modulating (PWM) the power supplied to the heating elements. The power to each heating element is controlled by a solid-state relay. By providing a fast PWM cycle rate, the average power supplied to each heating element is maintained at a level which achieves the user-selected temperatures in the heating chamber. The fast PW cycle rate avoids the relatively long periods of enabling and disabling of the heating elements which is associated with prior art controllers, thereby avoiding the large temperature excursions provided by prior-art devices.

Accurate and repeatable control of cooking time is provided by controlling the speed of the motor driving the product transport conveyor. Such speed control is achieved by pulse-width-modulating the power supply provided to the motor according to motor speed information derived by sensing the motor shaft position. The controller calculates a desired shaft position and compares it to the actual shaft position sensed. The shaft position error, measured by the difference between theses values, is used to adjust the PWM duty cycle of the motor drive circuit. An advantage of this approach is that is it easily adapted to a variety of motor types and heating chamber lengths. Indeed, for any reasonable oven configuration, only a single configuration value representing both motor characteristics and heating chamber length is needed for the controller to provide correct conveyor speed control.

The controller also provides extensive fault detection and degrades oven performance as gracefully as possible. For example, the oven detects failures in the conveyor drive system, the heater power supply circuits, and the temperature sensing circuits, and also detects many user programming errors. If an error is detected, the oven is shut down unless it can continue to operate safely and usefully. For example, in certain oven configurations if a single temperature control fails the controller will obtain and use temperature information from an adjacent temperature control. Although oven performance may be impaired, the oven may still continue to operate acceptably until it can be serviced.

BRIEF DESCRIPTION OF THE DRAWINGS

These and other features of this invention will be best understood by reference to the following detailed description of a preferred embodiment of the invention, taken in conjunction with the accompanying drawings, in which:

FIGS. 1, 1a, and 1b are simplified mechanical and electrical schematic diagrams of a conveyor oven control device constructed according to the present invention;

FIGS. 7A to 7C are a flow-chart of a motor control pulse-width-modulation duty cycle adjustment routine used in the oven control of FIGS. 1-4;

FIG. 11 is a flow-chart of the process of storing and retrieving user-recorded sets of operating parameters using preset keys.

DETAILED DESCRIPTION OF THE PREFERRED EMBODIMENT

Overview

Figure 3K:
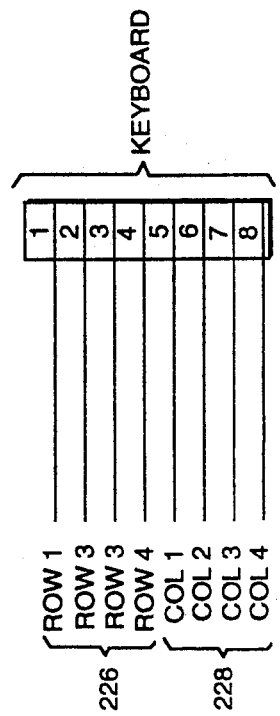
FIGS. 3A to 3I are a detailed electrical schematic diagram of the circuit of FIG. 2.
Figure 1B:
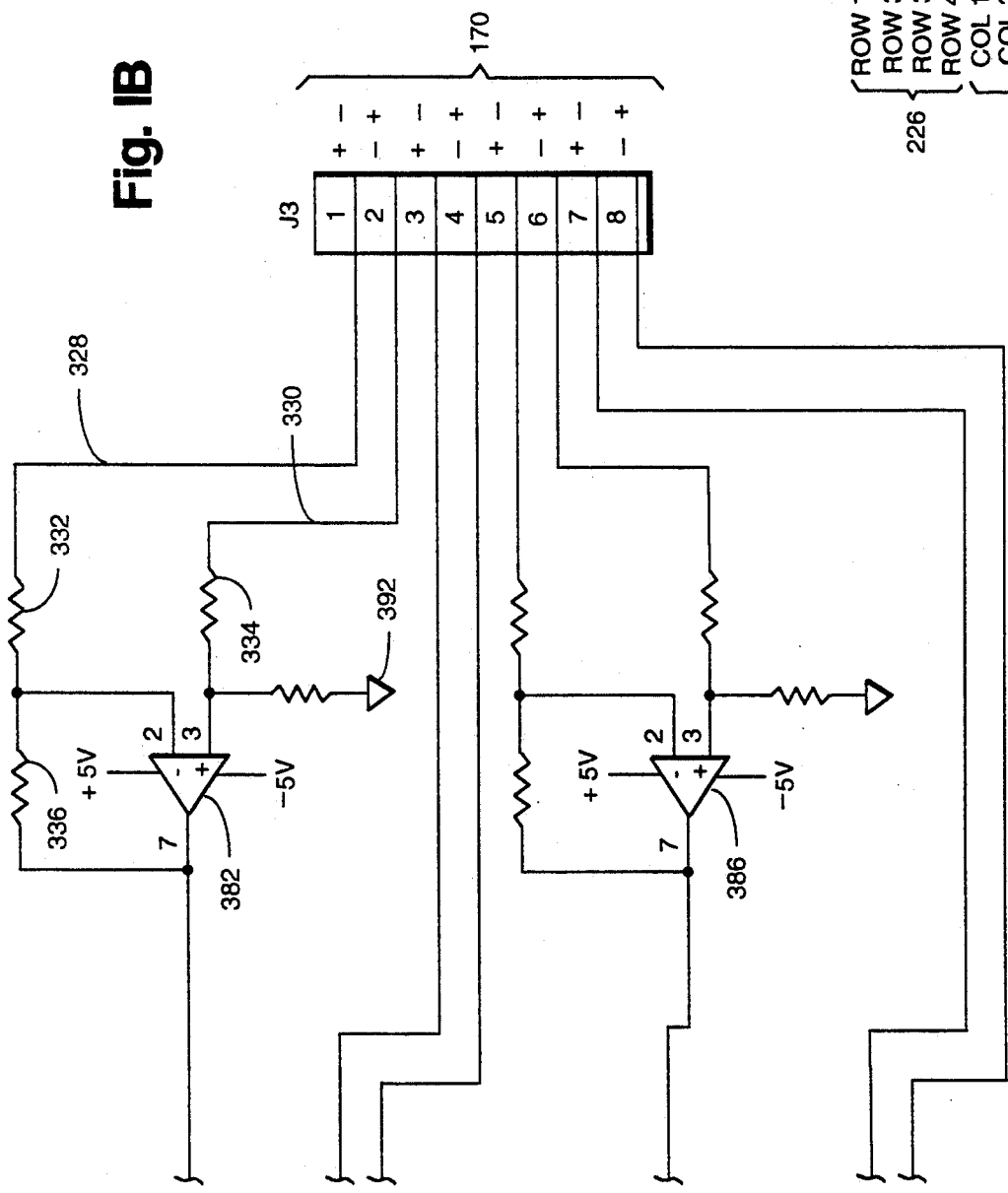

FIG. 1 is a simplified electrical and mechanical schematic diagram provided to show an environment in which a conveyor oven control device 100 constructed according to the present invention may be used. The control 100 is arranged to control the operation of a conveyor oven which is indicated generally by the dotted line 110 and which may be of any suitable design. For example, as shown in FIG. 1, the oven 110 may be a conveyor oven having a heating chamber 130, and a conveyor 140 for transporting through the heating chamber 130 a product to be cooked.

The heating chamber may be divided into a plurality of heating zones 132, 134, 136, 138, so that a product to be cooked, or portions thereof, may be exposed to different cooking temperatures in successive time periods a it is transported through the oven. For example, as best seen in FIG. 1, heating chamber 130 may be divided into first and second regions with respect to the longitudinal or product-movement axis, and each region may be further sub-divided into upper and lower heating zones, for a total of four zones. Each zone preferably has at least one heating element 162, 164, 166, or 168 which may be controlled without regard to the heating elements of the other zones.

In addition, each zone preferably has an appropriate temperature sensing device 172, 174, 176, or 178 to provide feedback so that the control 100 may enable each heating element as required to maintain a desired temperature in each respective zone. The temperature sensing devices 172, 174, 176, 178 may be any temperature sensors which are accurate and which are suitable for operation in the relatively high temperature environment of a commercial oven. In a preferred embodiment of the invention, the temperature sensors are preferably conventional thermocouples because such devices are reliable, relatively inexpensive, and widely available.

As will be discussed later in greater detail, the control 100 maintains a desired target temperature in each heating zone by controlling the average power supplied to the heating elements using a technique known as pulse-width-modulation (PWM). In summary, power to each element is repeatedly enabled and disabled on a periodic basis. The repeating period, or single cycle time, of each power application and removal is fixed, but the on-off duty cycle ratio is adjustable by the control 100 to supply the correct amount of average energy to the heating element to closely maintain the desired target temperature. The control 100 controls the supply of electrical power which is provided to heating elements 162, 164, 166, 168 over leads 160, and receives temperature readings measured by temperature sensors 172, 174, 176, 178 over leads 170.

Although a specific configuration of heating zones is shown in FIG. 1, the inventive oven control 100 could also be used with any other appropriate zone configurations. For example, the oven could have four zones displaced from each other along the product-movement axis, the zones could be arranged transversely, the zones could vary in size, or a different number of zones could be provided. Although the control 100 is primarily described herein in connection with a multiple-zone oven, it could also be used with an oven having only a single heating zone.

The product conveyor 140 has a suitable drive means 142 which is controlled by the inventive oven control 100. In most applications, the drive means 142 is preferably an electric motor of the type whose rotational speed may be controlled by varying the mean power supply voltage or duty cycle. However, prime movers other than electric motors (e.g. fluid turbines) could also be used if their rotational speed is a function of the mean power supply voltage or duty cycle. The conveyor drive means 142 is operatively connected to the conveyor 140 by a linkage schematically shown as dotted line 144. The linkage 144 may comprise any suitable means which converts the relatively rapid rotation of the motor shaft into appropriate translational motion of the product conveyor 140, including reduction gears or comparable apparatus.

In order for the inventive control 100 to accurately control the cooking time of products in the oven 110, it is necessary for the control 100 to monitor the operating speed of the product conveyor 140. Accordingly, any suitable shaft position sensor 150 is provided to detect the current position of the motor shaft 152. In the preferred embodiment, sensor 150 is a Hall-effect sensor which produces an electrical signal indicative of the proximity and polarity of a magnet 154 mounted on shaft 152. However, any other appropriate sensor, such as an optical detector or a shaft position encoder, could also be used. Sensor 150 preferably has a minimum resolution of one quarter revolution of shaft 152—that is, sensor 150 preferably produces at least four distinct electrical indicia corresponding to four relatively-equally spaced angular displacements of the shaft 152 totalling 360 degrees.

The control 100 maintains a desired product conveyor speed by controlling the average voltage applied to the conveyor drive motor 142, using the pulse-width-modulation technique. The control 100 controls the supply of electrical power to motor 142 over leads 148, and receives motor shaft position signals from shaft position sensor 150 over leads 146.

The inventive control 100 preferably has a control and display panel 120 for use by an operator to set the desired operating parameters for the oven 100. The control and display panel 120 preferably has display means 254, 256, 258, 260, 262 (FIG. 4) and keyboard means 342 (also FIG. 4) to allow the operator to interact with the control 100 for various functions (e.g., to establish a set of operating parameters, to store the parameters, or to recall pre-stored parameters for use). The control and display panel 120 will be discussed later in greater detail.

Hardware Facilities

Figure 2:
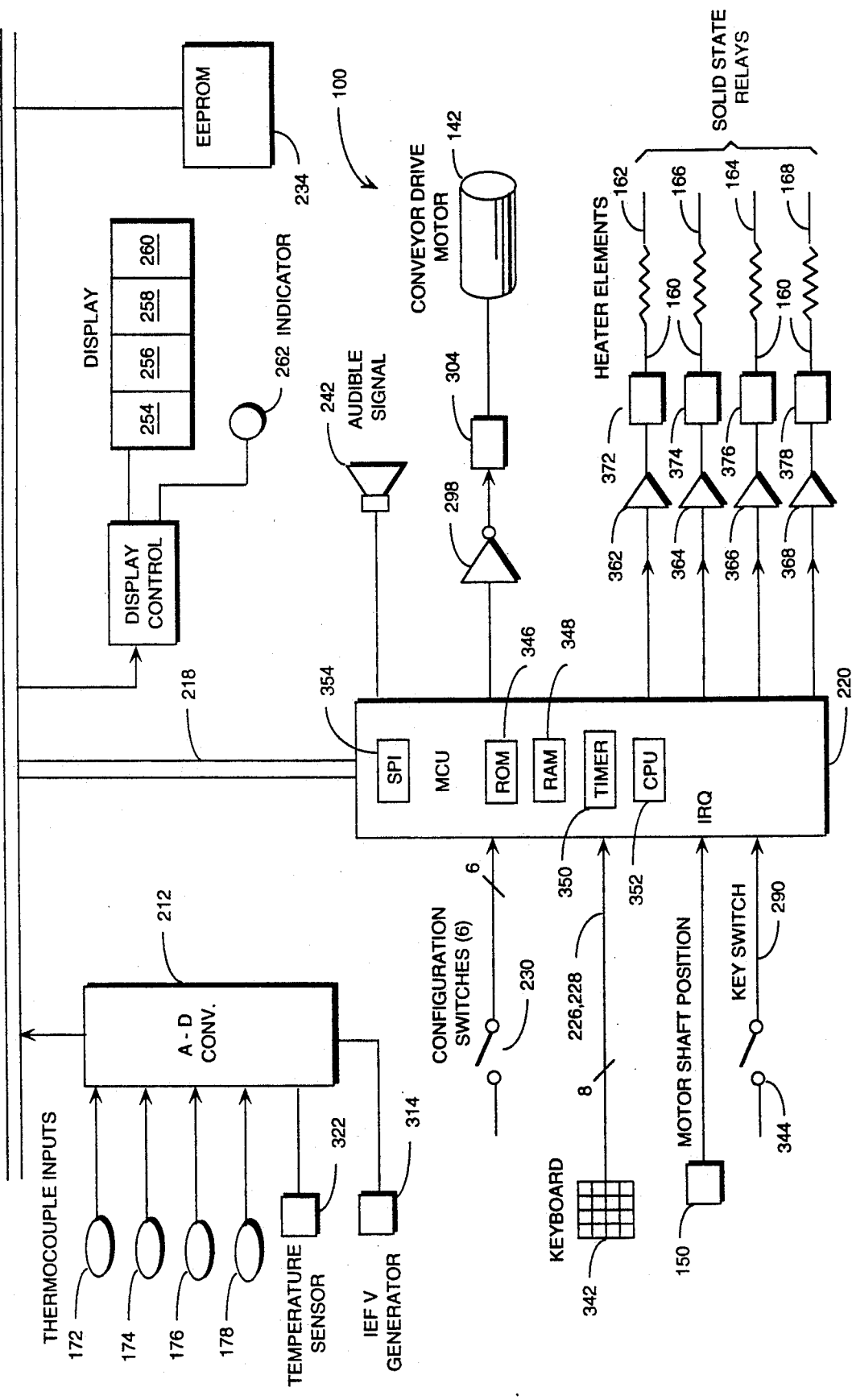
FIG. 2 is a simplified electrical schematic diagram of an exemplary electrical circuit in which the inventive conveyor oven control device of FIG. 1 may be implemented.
Figure 3E:
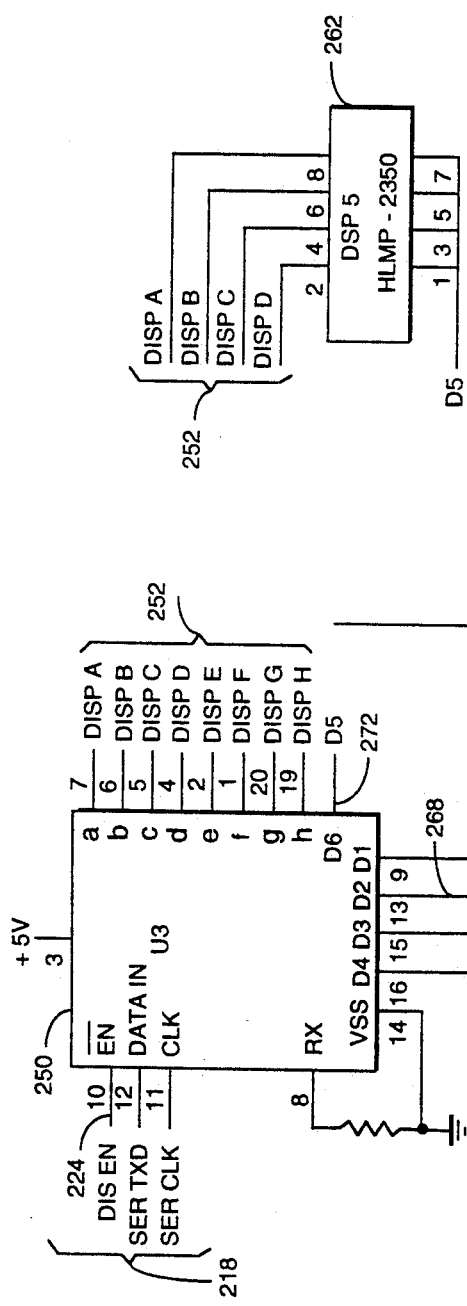
Figure 3E:
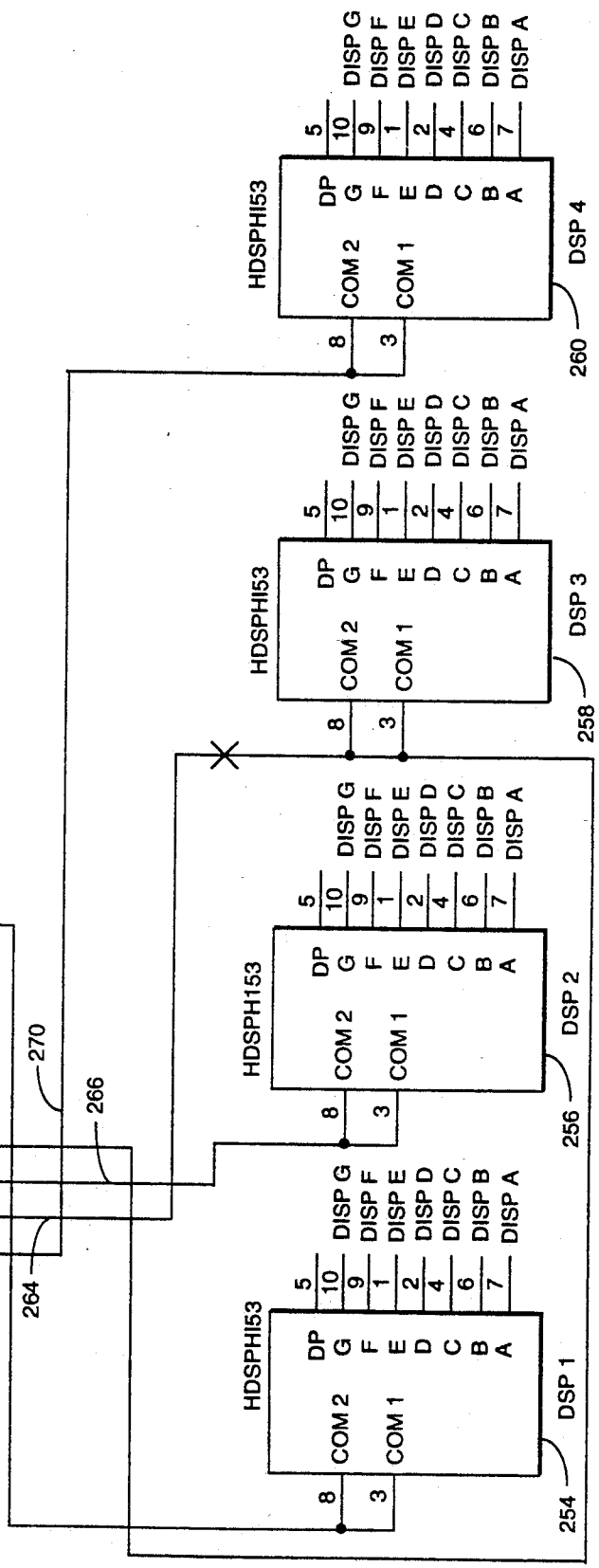
Figure 3F:
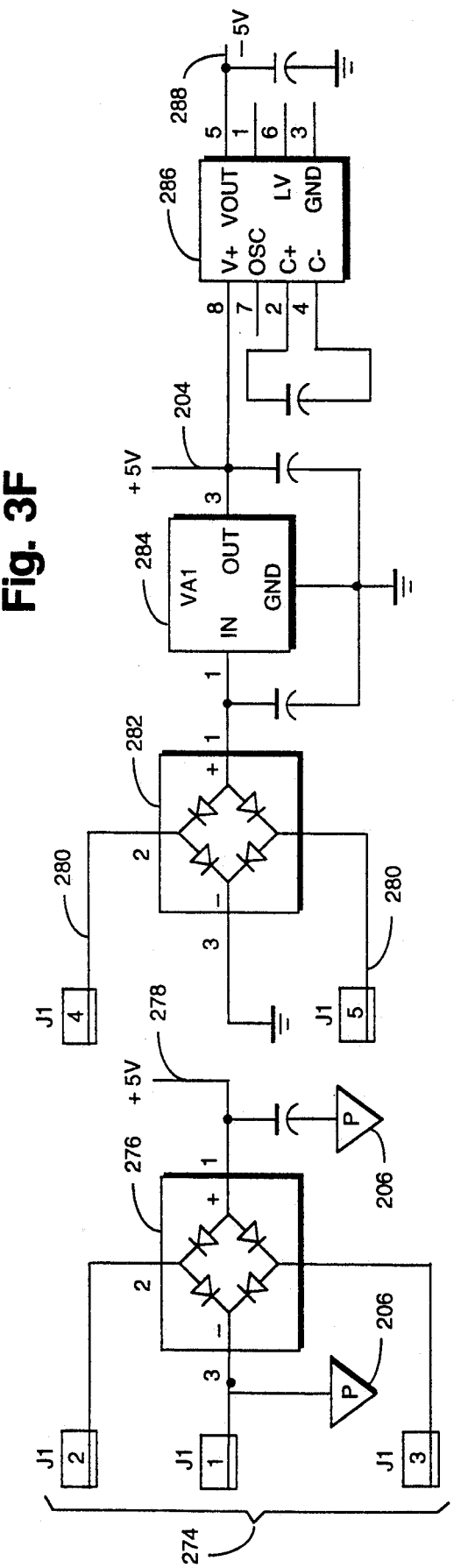
Figure 3G:
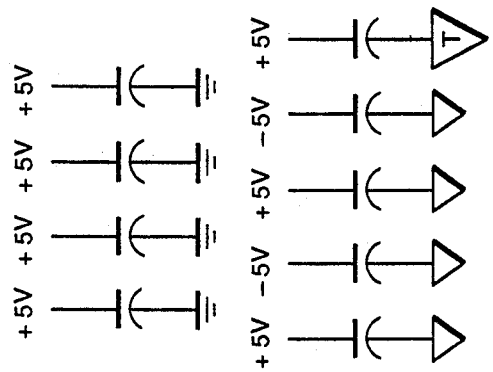
Figure 3H:
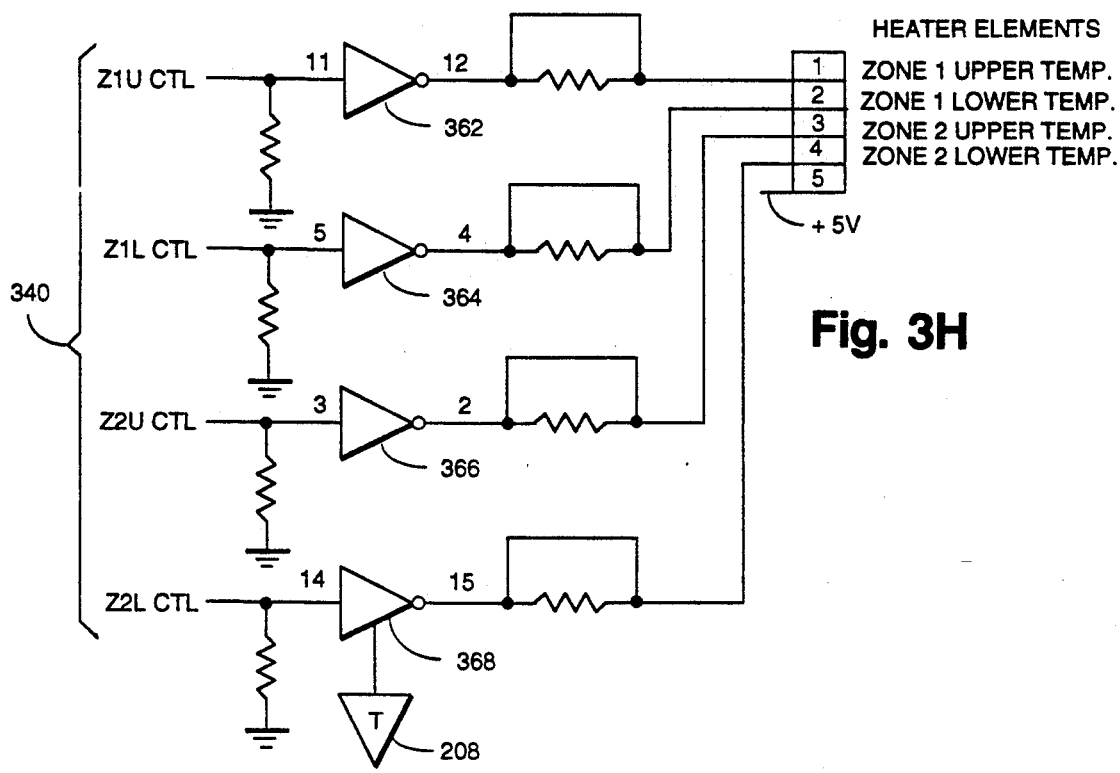
Figure 3L:
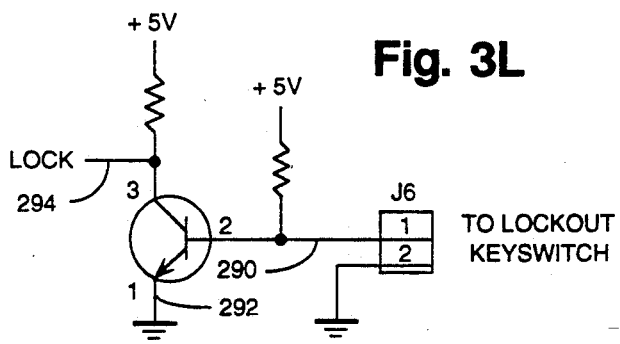
Figure 3J:
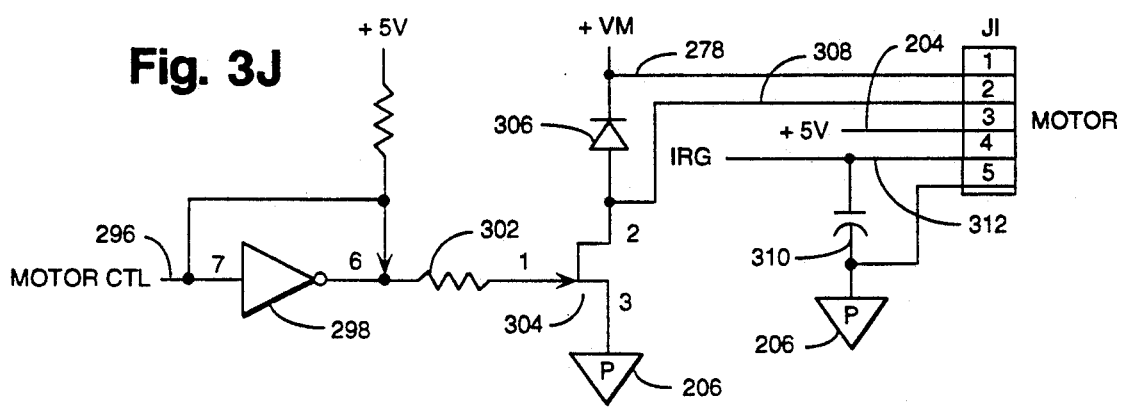
Figure 3I:
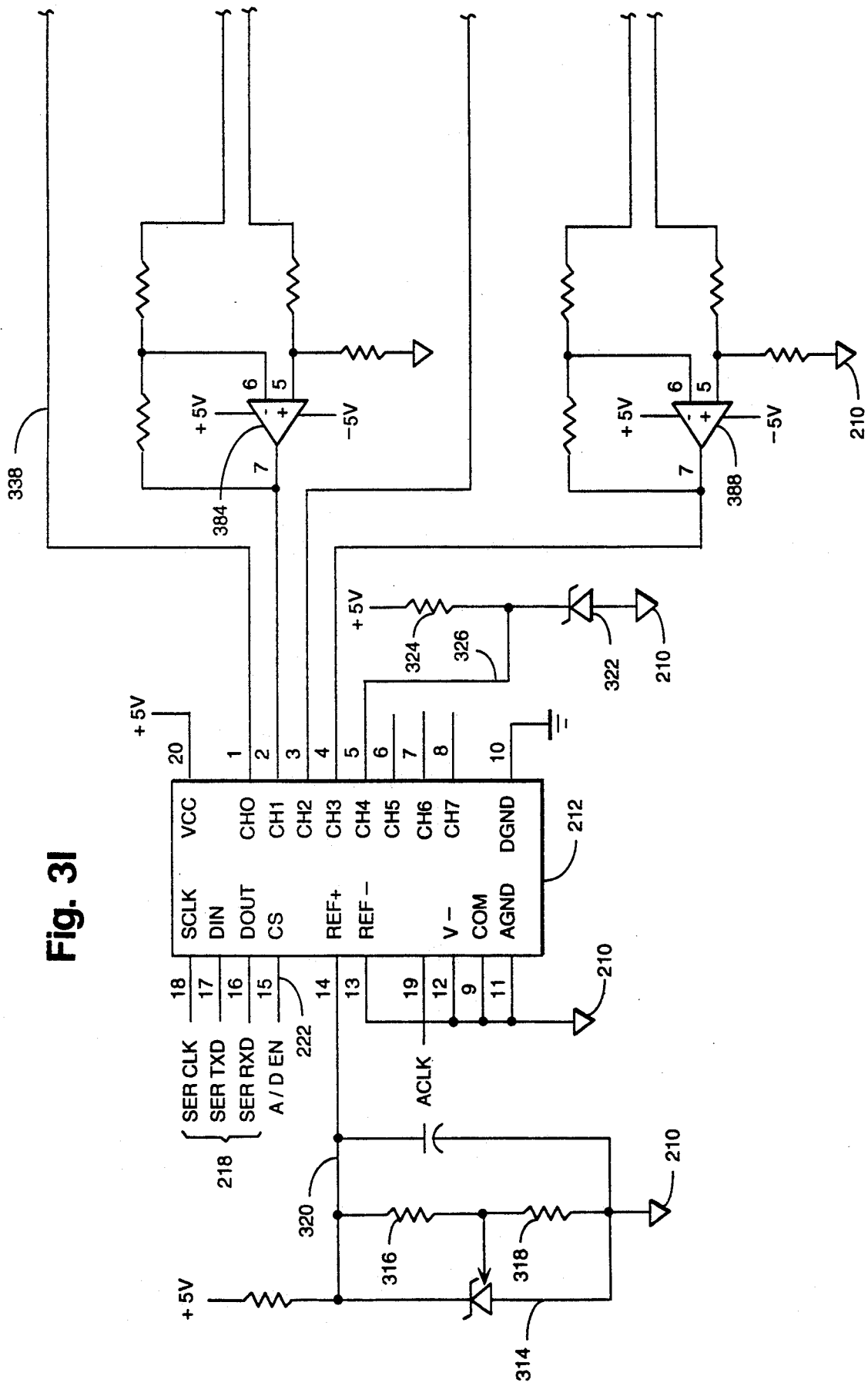

FIG. 2 is a simplified electrical schematic diagram of a circuit which may be used to implement the inventive conveyor oven control. FIG. 3 is a detailed electrical schematic diagram of the circuit. The circuit implementation will first be summarized with reference to FIG. 2. A more detailed description of the relevant portions of FIG. 3 will then be provided.

A suitable microcomputer unit 210 and appropriate control software associated therewith manages the operation of the inventive conveyor oven control 100. Microcomputer unit (MCU) 210 is preferably a "single-chip" microcomputer containing a central processing unit 352, read-only memory (ROM) 346 or its equivalent for storing the control program, read-write memory (RAM) 348 for storing data, a counter-timer facility 350 for accurate measurement and scheduling of real-time events, and appropriate interfaces to peripheral devices.

A suitable MCU is the type MC68HC11D3 microcomputer unit, which is available from Motorola, Inc., 1303 E. Algonquin Road, Schaumburg, Ill. 60196. The circuit of FIGS. 2–3 has been designed for use with this MCU, and a control program for the oven control 100 has been written for execution in such an MCU when connected as shown therein. However, a substantial number of other MCU units are available, both from Motorola and from other manufacturers, having capabilities generally similar to that of the MC68HC11D3, and such MCU units may also be usable if the circuit or control software were appropriately modified in a manner based on the teachings of this patent application and the general skill of the art.

The MCU 210 preferably includes a serial peripheral bus (SPI) 218 for communications with suitably designed peripheral devices. The SPI bus 218 is a simple synchronous serial bus for inter-device communications over a minimum of signal lines (RXD 240, TXD 238, and CLK 236). See FIG. 3. Hardware to support the SPI bus 218 is built into the MC68HC11D3 MCU, but the specifications for the bus are widely disseminated by the MCU manufacturer, and an MCU which lacks the SPI hardware could emulate it in software.

An analog-to-digital (A-D) converter 212 receives analog temperature measurements from thermocouples 172, 174, 176, 178 (FIG. 2) and converts these measurements into digital data suitable for use by the MCU 210. An additional temperature sensor 322 provides ambient temperature measurements to the A-D converter 212 for cold junction calibration of the thermocouples and to allow notification of the operator if ambient temperature conditions develop which would undesirably affect oven performance. The output from a reference voltage generator 314 is supplied to the A-D converter 212 to provide a stable voltage reference for all voltage measurements. Digital data acquired by the A-D converter 212 is supplied to the MCU 210 over the SPI bus 218.

A suitable display driver unit 250 preferably controls a plurality of display elements 254, 256, 258, 260 and an indicator element 262. The display elements are preferably conventional 7-segment multiplexed display devices, such as light-emitting-diode (LED) displays and may be used to display digits or other symbols to the operators. The indicator element 262 is preferably a high-intensity array of LEDs to provide a visual signal to the operator for certain events, such as when all oven parameters are within an acceptably small deviation from their operator-selected values. The display driver unit 250 communicates with the MCU 210 over the SPI bus 218 and frees the MCU 210 (and control software) from the task of forming characters and sequentially activating multiplexed display control lines.

The control device 100 preferably has an electrically-erasable programmable read-only-memory 234 (EEPROM) for non-volatile storage of oven operating parameters entered by the operator, calibration information, and other important variable data. The EEPROM 234 retains the information stored in it even when power is removed from the device, but it may be erased and reprogrammed as needed under control of the MCU 210. The EEPROM 234 preferably communicates with the MCU 210 via the SPI bus 218.

A variety of additional peripheral devices are connected for input to or output from the MCU 210. A set of six configuration switches 230 are connected to input ports of the MCU 210 to provide information on the oven configuration in which the control 100 is used. This permits a single, flexible control program to be installed in the control 100 for use in a wide variety of oven configurations. The switches 230 may also be used to request that the control software enter special modes which are not normally accessible to the oven user, such as calibration modes.

The keyboard 342 (FIGS. 2, 4) is preferably wired in a four-by-four "crosspoint" configuration to minimize the number of signals 226, 228 needed by the MCU 210 to service the keyboard. The MCU 210 may use well known key scanning algorithms to recognize keys which are depressed by the user.

The state of a key-operated switch 344 is preferably provided to an input port of the MCU 210 over lead 290 so that the MCU may prohibit operation of certain control functions or the entire oven by unauthorized users.

The motor shaft position sensor 150 is preferably connected over leads 146 (FIG. 1) and 312 (FIGS. 2, 3) to an interrupt request input (IRQ) of the MCU 210 so that the MCU 210 can identify and record changes in the position of motor shaft 152. The +5 V power supply is provided to the motor shaft position sensor 150 via lead 204 (FIG. 3).

An audible signal 242 is connected to an output port of the MCU 210 so that the MCU may alert the operator of fault conditions, completion of a product cooking cycle, and other events.

An output port of the MCU is buffered by inverter 298 and amplified by driver transistor 304 to control the power supply to the conveyor drive motor 142.

For each of the heater elements 162, 164, 166, and 168, a separate output signal from the MCU is buffered by a respective inverter 362, 364, 366, and 368 and provided to a respective solid state relay 372, 374, 376, 378. The solid-state relays control power supplied to the heater elements.

FIG. 3 is a detailed schematic of a preferred circuit implementation of an oven control device 100 constructed according to the present invention.

Several power supply circuits provide properly conditioned power for the control 100 and peripheral loads. A first power supply circuit provides power for running the conveyor drive motor 142. AC power at about 75 V peak-to-peak is supplied to a full-wave bridge rectifier 276 over leads 274 by a transformer (not shown) which is connected to the power supply input of the oven. The positive output of rectifier 276 is filtered by an appropriate capacitor and supplied as +Vm on lead 278. Because the motor is a highly inductive load, and will be driven by a pulsed speed control circuit, it is desirable to isolate the motor power supply from that of the remainder of the control circuit to protect the other circuits from power supply disturbances. Accordingly, a separate ground 206 is provided for the motor power supply circuit.

A second power supply circuit provides power for most of the remainder of the oven control device 100. AC power at about 12 V peak-to-peak, supplied over leads 280 to a full-wave bridge rectifier 282 by a transformer (not shown) which is connected to the power supply input of the oven. The positive output of rectifier 282 is filtered by an appropriate capacitor and supplied to the input of a voltage regulator 284. Voltage regulator 284 provides a regulated +5.0 V output across +5 V lead 204 and main ground 202. Voltage regulator may be any suitable three-terminal integrated voltage regulator, such as the type 7805, which is available from a variety of manufacturers. An integrated DC-to-DC converter 286 receives +5 V and produces a −5 V output on lead 288. Converter 286 is preferably a type ICL7660 converter from Harris Semiconductor, although another similar converter could also be used.

The type MC68HC11D3 microcomputer unit (MCU) 210 operating frequency is controlled by an 8 MHz crystal 214. A reset generator 216 provides a controlled reset pulse when power is first applied to the circuit. The reset generator 216 is preferably a type MC34064, which is available from Motorola, Inc., but other similar devices could also be used.

The MCU 210 includes its own RAM and ROM for storage of data and control program instructions. In high-volume applications MCUs containing EPROMs are more expensive on a per-unit basis than those containing mask-generated ROMs, but in applications in which the volume is sufficiently low that production of an MCU with a fixed ROM is economically unjustified, the MC68HC711D3 version of the device may be preferable. This version contains an EPROM instead of the ROM, and may be easily programmed using available programming devices. This avoids the considerable cost of producing the mask-generated ROM.

In addition, because it is desirable to maintain user-selected sets of oven operating parameters and other important data, even while power has been removed from the oven, an electrically erasable programmable read-only memory (EEPROM) 234 is preferably provided to store this information. The EEPROM is preferably accessed serially over the SPI bus 218 provided by MCU 210. This capability allows the EEPROM 234 (and other SPI-bus-capable devices) to communicate bi-directionally with the MCU 210 using only the three signals 236, 238, and 240, of the SPI bus 218 and an enable signal. The MCU 210 provides an EEPROM ENABLE signal on lead 220, using one bit of its general-purpose I/O lines. The EEPROM may be erased and reprogrammed under control of the MCU 210, but otherwise retains the data stored therein despite any power supply interruptions.

A display driver 250 provides control signals suitable for driving the LED displays 254, 256, 258, 260, and 262. The display driver is preferably a type MC14489 device which is available from Motorola, Inc., although other suitable display drivers could also be used. The display driver 250 preferably communicates serially with the MCU 210 over the SPI bus 218 to minimize use of I/O ports of the MCU 210. Because the SPI bus 218 is shared among several peripheral devices, the MCU 210 produces a display driver enable signal on lead 224 to identify when communications are being conducted with the display driver 250. The display devices 254, 256, 258, 260, and 262 are preferably either common-anode or common-cathode devices, so that one terminal of each LED segment may be connected together. The display driver 250 produces signals for driving the display segment leads which are shown as a bus 252. For each display device 254, 256, 258, 260, 262, the display driver also produces a separate signal 264, 266, 268, 270, and 272 respectively, for driving the common lead of each display. A particular segment in a given display device is illuminated by activating that device's common lead and the particular driver lead connected to that segment. This multiplexed display arrangement permits the display driver to control each device, but reduces the number of control leads required.

A set of six configuration switches 230, which may be "DIP" switches, or the equivalent, are connected to inputs of the MCU 210 via leads 232.

The MCU 210 can activate a piezo-electric buzzer or other suitable alerting device 242 by activating lead 246. A suitable buffer 244, such as one unit of an MC4049B CMOS inverter device, is preferably provided to supply sufficient current to drive the buzzer 242.

The MCU 210 produces a control signal for each of the heater elements on leads 340. A respective buffer 362, 364, 366, and 368 is provided for each heater element control signal to supply sufficient current to drive a respective solid-state relay 372, 374, 376, 378 (FIG. 2). Buffer devices of any suitable type, such as the units of an MC4049B CMOS inverter shown in FIG. 3, may be used as buffers 362, 364, 366, and 368. The power supply ground signal 208 for buffers 362, 364, 366, and 368 is preferably isolated from the remainder of the control circuit to avoid power supply disturbances which may be undesirably propagated through the buffers. The solid-state relays accept the relatively low-voltage, low-current output signals provided by buffers 362, 364, 366, and 368 on leads 390, and responsively control the high-voltage, high-current AC electrical power supplied to the heater elements 162, 164, 166, 168. The solid state relays preferably contain means to confine switching of the relay outputs to times in a narrow vicinity about zero-voltage points in the AC voltage waveform. Any suitable solid-state relay devices which have sufficient power-handling capability and are compatible with the output signals on leads 390 may be used. For example, model D2475 solid-state relays, which are available from Crydom Company, and which are rated at 240 VAC., 75 A continuous current, could be used.

The MCU produces a motor control output signal on lead 296. A suitable buffer 298, such as one unit of an MC4049B CMOS inverter device, is preferably provided to supply sufficient current to drive the motor control transistor 304. Transistor 304 is preferably an N-channel field-effect transistor (FET) capable of accepting a logic-level input and capable of driving loads exceeding 5 A at 100 V, such as the type MTP10N12L device which is available from Motorola, Inc. A resistor 302, which may be 470 ohms, is preferably connected in series with the output of buffer 298 to limit the current supplied to transistor 304. The source terminal of transistor 304 is connected to the motor power supply ground 206. The drain terminal of this transistor is connected to one power lead 308 of the drive motor 142. The remaining power lead of the drive motor is connected to the motor power supply output lead +Vm 278. Thus, the motor control transistor 304 controls the ground current path between the motor power lead 308 and the motor power supply ground 206, and thereby enables or disables power to the motor. A suitable fast-recovery diode 306, such as type MUR415 available from Motorola, Inc., is preferably provided across the motor power leads. The diode provides a path through which current from the windings of motor 142 may flow during periods when the motor control transistor 304 is turned off. Because these motor windings are highly inductive, the current will increase while the motor control transistor is on, and will decay while the motor control transistor is off. It is this decay current which flows through diode 306. The pulse width modulation method of the present invention provides a sufficiently high repetition rate to maintain continuous current flow through the motor windings, in the sense that the motor winding current is not allowed to decay to zero.

A motor shaft position sensor 150 senses the position of one or more indicia 154 installed on the shaft 152 of motor 142. In the preferred embodiment of the invention, a suitable magnet having four pairs of poles is used to indicate the shaft position to one-quarter of a revolution, and the sensor 150 is preferably a Hall-effect magnetic proximity sensor. However, other suitable indicia and sensors could also be used. The Hall-effect sensor provides an open-collector output which appears across leads 312 and the motor power supply ground 206. A pull-up resistor 314, which may be a 4.7K ohm resistor, is provided across lead 312 and the +5 V power supply lead 204. The sensor 150 sinks current from lead 312 to the motor power supply ground 206 when in a magnetic field of one polarity, and appears as an open circuit when in a magnetic field of the opposite polarity. Thus, the sensor 150 produces four high-to-low transitions on lead 312 for each revolution of the motor shaft 152. Lead 312 is preferably connected to the interrupt request (IRQ) input of the MCU 210, which is preferably programmed to respond only to high-to-low transitions. A capacitor 310, which may be 470 pf, is preferably provided across leads 312 and 206 to prevent noise impulses which may be picked up on lead 312 or other wiring from producing spurious IRQ interrupt requests.

The control 100 receives signals from temperature sensors 172, 174, 176, and 178 over leads 170. In the preferred embodiment of the invention, the temperature sensors are preferably type-K thermocouples. Each thermocouple produces a differential voltage proportional to the temperature difference between the thermocouple's warm junction temperature and its cold junction temperature. The warm junction is located in the heating chamber, and the cold junction is preferably located on the circuit card housing the control circuit, which may be considered to be at ambient temperature.

The signal produced by each thermocouple 172, 174, 176, and 178 is preferably provided to a suitable differential amplifier 382, 384, 386, and 388, respectively, to amplify the signal to a level convenient for conversion to digital form for use by the MCU 210. The differential amplifiers may be implemented using units of a type OP-290 quad operational amplifier, available from Precision Monolithics, Inc., or any other suitable device. Each amplifier has a suitable input and feedback network in order to control the input impedance and gain of the amplifier. For example, amplifier 382 has a pair of resistors 332 and 334 (1K ohm, 1%) in series with the input signals, a feedback resistor 336 (165K ohm, 1%) connected between the negative input lead and the output lead 338, and a symmetrical gain resistor 392 (165K ohm, 1%) connected between the positive input lead and an isolated thermocouple circuit ground 210. The remaining amplifiers 384, 386, and 388 preferably have similar networks. The networks establish the gain of the amplifiers at approximately 165. The single-ended output leads of each amplifier 382, 384, 386, 388 are provided to separate input channels of A-D converter 212.

A-D converter 212 is preferably a 12-bit device having at least five input channels and capable of communicating with MCU 210 via the SPI bus 218. The type LTC-1290 12-bit A-D converter, available from Linear Technology Corporation, is a suitable device for implementing this function. The MCU 210 provides an A-D converter enable signal on lead 222 to indicate when transactions on the SPI bus 218 are intended for the A-D converter 212.

An additional temperature sensor 322 is preferably provided on the circuit card housing the control circuit to sense the ambient temperature in that region. The temperature sensor 322 preferably provides an output voltage proportional to temperature over a typical range of ambient temperatures, and may be implemented with a type LM-335 temperature sensor, available from National Semiconductor, or another appropriate sensor. The ambient temperature measurement is needed in order to compensate temperature readings obtained from the thermocouples by taking into account the actual temperature at the cold junction of the thermocouples. In addition, an excessive ambient temperature may indicate that a malfunction exists and that oven operation should be curtailed. A resistor 324 (3.3K ohm) is preferably connected between the +5 V supply lead 204 and anode lead 326 of temperature sensor 322. The cathode of temperature sensor 322 is preferably connected to the isolated thermocouple circuit ground 210. The anode lead 326 provides a temperature-sensitive output signal from the sensor 322 and is provided to an input channel of the A-D converter 212.

A precision voltage reference signal is provided to the A-D converter 212 on lead 320 to ensure accurate conversions. A voltage reference source 314, in conjunction with resistors 316 and 318, provides a 3.98 V reference signal on lead 320. The voltage reference is preferably a type LM-385 voltage reference, available from National Semiconductor, but other voltage references could also be used.

The MCU 210 receives four row signals 226 and four column signals 228 which indicate activations of the individual keys of keyboard 342 (FIG. 2). Each key of keyboard 342 has assigned to it a unique combination of one row signal and one column signal. When the key is activated by the user, the row and column signals assigned to the key are connected together. The MCU 210 uses conventional key scanning algorithms to detect which key has been activated.

A key switch 344 is provided to disable certain control functions, such as modification of the user-recorded sets of oven operating parameters, by unauthorized operators. The key switch output signal 290 is biased at +5 V and is provided to the base of an inverting buffer transistor 292. The collector of the buffer transistor 292 is biased at +5 V and connected to an output lead 294. The lock output lead 294 is connected to an input of the MCU 210. Transistor 292 may be any suitable general-purpose NPN transistor, such as a type 2N2222.

Software Functional Overview

The operating software resident in the inventive oven control 100 is responsible for controlling interactions with the user and maintaining oven operating parameters, such as the cooking temperature in each zone and the cooking time (controlled by conveyor speed), within an acceptably small deviation from those selected by the user.

Figure 4:
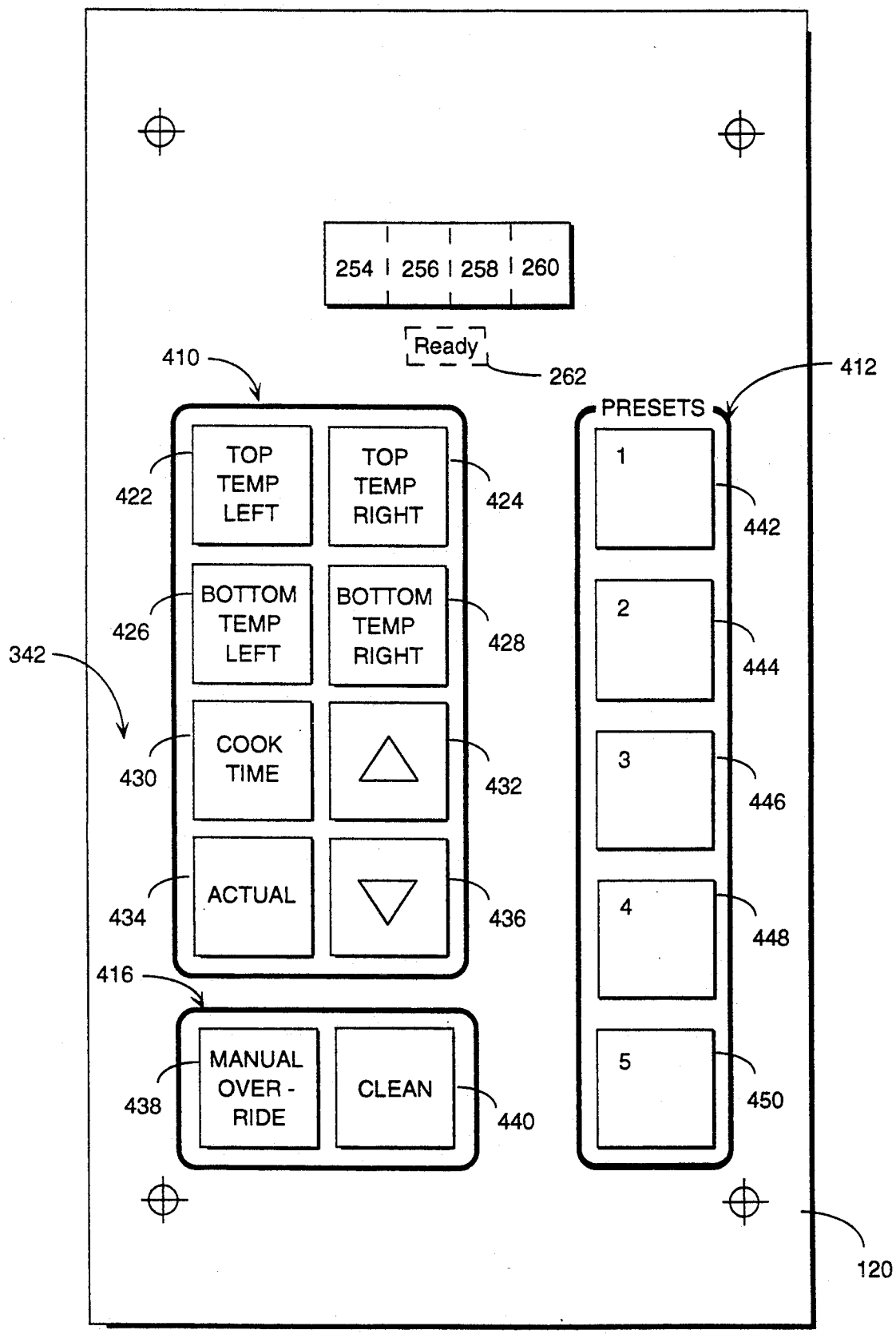
FIG. 4 is a front elevation view of a control and display panel for use with the conveyor oven control of FIGS. 1-3.

User interactions are accomplished via the control and display panel 120 (FIG. 4). The panel 120 comprises a numerical display consisting of four display digits 254, 256, 258, 260, a "READY" indicator 262, and a keyboard 342.

The keyboard 342 is preferably divided into three groups of functionally-related keys. A first group of keys 410 allows the user to select, display, or modify any of the five oven operating parameters (i.e. temperatures for zones 1 through 4 and total cook time). Keys 422, 424, 426, and 428 select, for modification or display, the desired temperature in the first, second, third, and fourth heating zones. Key 430 selects, for modification or display, the desired total cook time. Key 432 increases the currently selected parameter. Key 436 decreases the currently selected parameter. Key 434 causes the current measured value of the currently selected parameter to be displayed.

Figure 10:
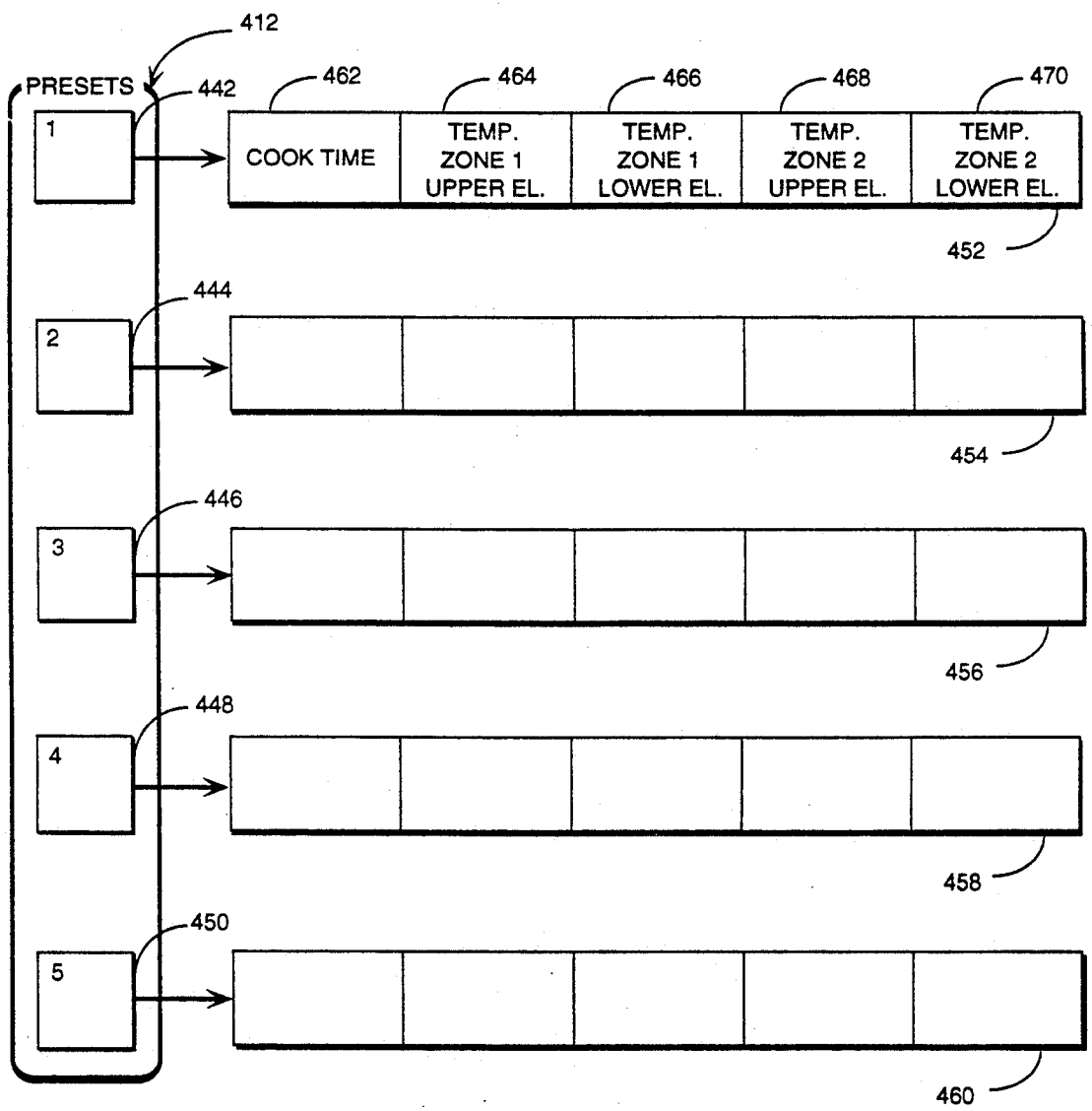
FIG. 10 is a diagram of a data structure for storing user-recorded sets of desired oven parameters.

A second group 412 of keys 442, 444, 446, 448, and 450 allow the operator to select for use or to record any of five instantly-accessible sets of oven parameters. As best seen in FIG. 10, for each of the keys 442, 444, 446, 448, 450 in group 412, there exists a corresponding collection of memory locations 452, 454, 456, 458, 460 respectively, accessible to the MCU 210 for storing a complete set of oven operating parameters. A complete set of parameters includes a target temperature for each zone for which the control may be configured and a total cook time. For example, key 442 corresponds to a first collection 452 of storage locations 462, 464, 466, 468, 470, and each of these locations is allocated to one of the above-mentioned oven operating parameters. Similarly, key 444 corresponds to a second collection 454 of parameters.

When one of the keys in group 412 is pressed, it immediately retrieves the corresponding set of parameters for use in controlling the oven. For example, key 442, when pressed, immediately retrieves the first set of operator-recorded oven parameters to be used for controlling the oven. Once the parameters are retrieved for use, they may be modified if necessary and the modified parameters may then be re-recorded by pressing key 442 a second time. Thus, each of the five sets of operator-recordable parameters may be instantly retrieved by pressing the corresponding one of keys in group 412.

The process 950 of retrieving operating parameters using the preset keys is shown in FIG. 11. The process begins at step 960. At step 962, the user presses one of the preset keys 412, thereby selecting a set of oven operating parameters from those which had previously been stored in the EEPROM. Before retrieving the new set of parameters selected by the user, any changes which the user may have made to the currently selected oven parameters are recorded in the EEPROM (if such recording is permitted by key switch 344). In step 964, the presently selected operating parameters are inspected to determine if the user has made any changes to them since that set of parameters was requested. If no changes were made, there are none to record in EEPROM, and execution continues at step 970. If such changes were made, however, then execution continues at step 966, where the state of key switch 344 is inspected to determine whether parameter changes should be recorded in EEPROM. Keyswitch 344 is provided so that the oven operator may prohibit unauthorized changes to the parameters stored in EEPROM. If keyswitch 966 is set to authorize changes, then at step 968, any changes made to the old set of parameters are stored in EEPROM. Otherwise, execution continues at step 970.

In step 970, the new preset selection is compared to determine if that selection is the same as the previously selected set. If they are the same, then there is no need to retrieve a new set of parameters from EEPROM, and execution continues at step 974. If they are not the same, however, then in step 972, the control software retrieves the parameters corresponding to the preset key selected by the user and adjusts oven operation to conform to the retrieved parameters. The process ends at step 974.

A third group of keys 416 provide special functions relating to the overriding of current settings and to placing the oven in a self-cleaning mode. Although most oven operators, during normal use, will merely select, (from among the previously stored parameter sets) the one appropriate for the product being cooked, it may be desirable in some situations to deviate from the prestored parameters. Accordingly, the manual over-ride key 438 permits the user to vary, using the keys of group 410, one or more of the oven operating parameters. When the oven is operating in the manual over-ride mode, the control 100 preferably provides an indication of that fact to the user in order to prevent inadvertent cooking of products at incorrect oven parameters. For example, the control 100 may cause the information in the display to flash in order to indicate that the oven is currently operating in manual over-ride mode. Selecting any of the preset keys cancels the manual over-ride mode and retrieves the parameters corresponding to that preset key.

The clean key 440 initiates a self-cleaning cycle. Unless terminated prematurely by the operator, the self-cleaning cycle operates for a predetermined period, such as one hour. All zone temperatures are set to 900 degrees F. The product conveyor operates at the 20 minute cook time speed. In order to prevent a self-cleaning cycle from being inadvertently activated, the clean key 440 preferably must be depressed continuously for at least two seconds in order to activate the cycle. During a clean cycle, the operator may terminate the cycle early by depressing the clean key 440 again for two seconds. Whenever the clean cycle is terminated the control resumes operation with the parameters corresponding to the previously selected preset key. The control 100 preferably provides an indication to the user that the oven is performing a self-cleaning cycle. For example, the control 100 may present the message "CLN" in the display.

The control software is also responsible for maintaining the speed of the product transport conveyor in order to achieve the total cooking time selected by the user. The speed of the conveyor drive motor 142 is controlled by pulse-width-modulation of the electrical power supplied to the motor. In order to determine whether the motor is operating too quickly, too slowly, or at the correct speed, the MCU 210 receives feedback as to the position of the motor shaft 152 from a motor shaft position sensor 150. A magnet 154 or other detectable position indicator is applied to the motor shaft 152. The sensor 150 generates a signal each time the shaft rotates by a predetermined amount. In the preferred embodiment of the invention, the sensor produces the signal each time the shaft rotates one-quarter turn. The control software responds to the signal produced by sensor 150 to maintain in storage a record of the current motor shaft position.

The control software also maintains in storage a high-precision record of the desired motor shaft position---that is, the position the motor shaft would occupy if the motor were operating at exactly the desired speed. The desired shaft position is periodically calculated by adding a high-precision shaft movement increment to the current desired shaft position. The shaft position increment is recalculated from time to time using the desired cooking time and information relating the length of the product conveyor and the conveyor drive linkage parameters to the rotational speed of the motor shaft 152.

Pulse-width-modulation (PWM) of the conveyor motor power supply is accomplished by cyclically enabling and disabling the motor power lead according to a present-duty-cycle variable maintained in storage. The total time of each cycle is fixed, but the relative duration of the "on" and "off" times during each cycle is responsive to the present-duty-cycle variable.

The PWM algorithm differs slightly depending on whether the desired duty cycle is greater or less than 50 percent. For duty cycles below 50 percent, the motor power is automatically disabled at the beginning of each PWM cycle. Using a timer facility of the MCU 210, a time within the cycle at which the motor is to be re-enabled is scheduled by inserting a value representing that time in a register of the counter facility. The counter hardware then automatically enables the motor at the scheduled time. In addition, an interrupt is scheduled for the end of the present PWM cycle, which is the beginning of the next PWM cycle. When the interrupt occurs, the interrupt service software reschedules the enable/disable event times and reschedules the next interrupt time. As noted previously, the counter hardware automatically disables the motor power when the interrupt occurs. For duty cycles greater than 50 percent, on the other hand, the opposite procedure is followed. The counter hardware automatically enables the motor power at the beginning of each PWM cycle and schedules an interrupt to occur during the cycle, at which time the motor power is automatically disabled (toggled).

This interchanged operation of the PWM algorithm depending on duty cycle is needed because of the length of time required to service the beginning-of-cycle interrupt. For example, if the long-duty-cycle method were used for extremely short duty cycles, the running of the beginning-of-cycle interrupt service software would not be completed before the motor-disable interrupt were signaled. This would produce an undesired artificial limit on the minimum duty cycle which could be specified by the control software.

In order to determine the PWM duty cycle required to maintain the desired motor speed, the control software periodically calculates and stores a target duty cycle which is proportional to the measured error between the actual motor shaft position and the desired motor shaft position. If the motor shaft is ahead of the desired position, the motor is operating too rapidly, and the target duty cycle is lowered. If the motor shaft is behind the target position, the motor is operating too slowly, and the target duty cycle is raised. During each adjustment period, the actual PWM duty cycle is adjusted toward the target duty cycle. However, in order to prevent instabilities in the motor speed control process the feedback mechanism is severely damped by limiting the adjustment of the actual motor PWM duty cycle to an increment or decrement of 1/256 of its total range.

Figure 5:
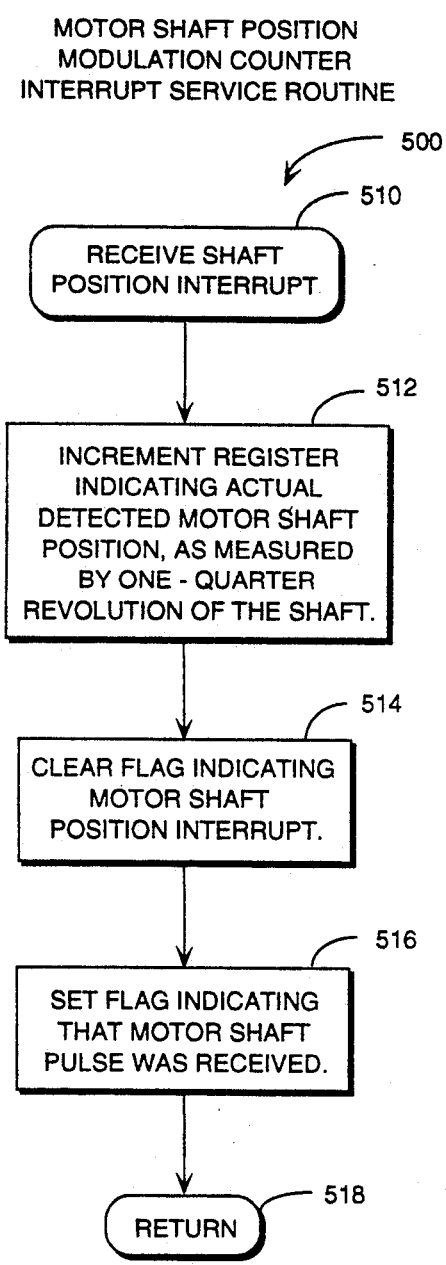
FIG. 5 is a flow-chart of a motor shaft position interrupt service routine which is part of the operating software used to control the inventive conveyor oven control of FIGS. 1-4.

The motor speed control process is shown in more detail in FIGS. 5-8. FIG. 5 is a flow chart of the motor shaft interrupt service routine 500 which maintains a record of the current motor shaft position responsive to signals from the motor shaft position sensor 150. Each time the motor shaft rotates one-quarter revolution, the sensor produces a signal which is provided to the interrupt request (IRQ) input of MCU 210. MCU 210 enters the service routine 500 at step 510 upon receipt of each such interrupt request. At step 512, a datum in storage labeled SPOSM is incremented. SPOSM represents the current shaft position as measured by the number of quarter-shaft-revolution pulses received from the shaft position sensor 150. In step 514, an internal MCU flag, indicating that a motor shaft position (IRQ) interrupt has occurred, is cleared to enable processing of subsequent IRQ interrupts. In step 516, another flag, indicating that a motor shaft position pulse has been received, is set. At step 518, control is returned to the program steps being executed prior to receipt of the shaft position interrupt request.

Figure 6:
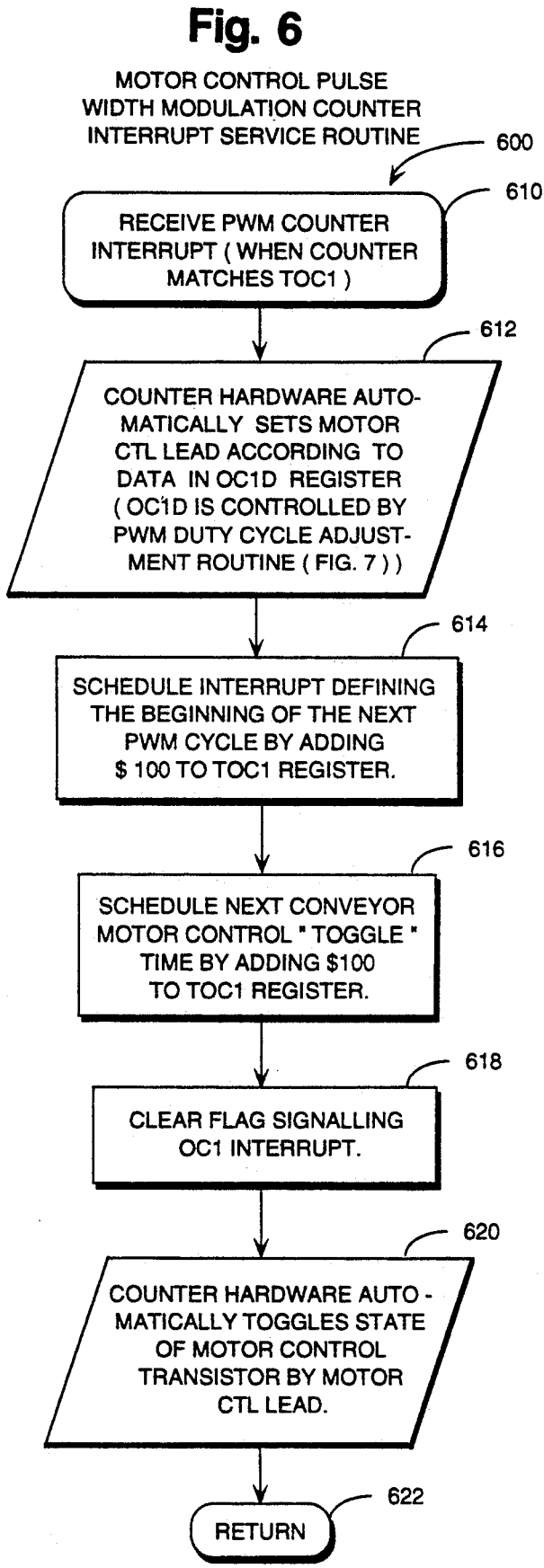
FIG. 6 is a flow-chart of a motor control pulse-width-modulation counter interrupt service routine used in the oven control of FIGS. 1-4.

FIG. 6 is a flow chart of the motor control PWM counter interrupt service routine 600. The timer facility of the MCU 210 preferably includes, inter alia, a timing counter operating at a predetermined rate, e.g. 2 MHz, a first output compare register TOC1, and a second output compare register TOC3. Whenever the timing counter matches the value stored in TOC1, the counter hardware causes a counter interrupt and automatically copies a predetermined bit of an internal register OC1D to the output port which controls the motor power lead. Whenever the timing counter matches the value stored in TOC3, the counter hardware automatically toggles the motor power lead.

The interrupt service routine 600 of FIG. 6 runs each time the TOC1 counter interrupt is signaled; thus, this interrupt defines the end of each PWM cycle and the beginning of the next. At the beginning of each PWM cycle, the TOC1 interrupt causes the datum in OC1D to be copied to the output port which controls the motor power lead. The datum in OC1D is set by the PWM duty cycle adjustment routine 700 (FIG. 7) according to whether the duty cycle is greater or less than 50 percent. If the duty cycle is greater than 50 percent, then PWM duty cycle adjustment routine 700 (FIG. 7) stores an appropriate datum in OC1D so that the motor power is enabled at the beginning of each cycle (when the TOC1 interrupt occurs) and disabled (by toggling) when the TOC3 interrupt occurs. If the duty cycle is less than 50 percent, then routine 700 stores an appropriate datum in OC1D so that the motor power is disabled at the beginning of each cycle (when the TOC interrupt occurs) and enabled (toggled) when the TOC3 interrupt occurs. At a predefined time after the beginning of the cycle, determined by the offset or difference between the values stored in TOC1 and TOC3, the motor power lead will be automatically toggled. Routine 700 adjusts the relative lengths of the motor "on" and "off" times by adjusting the offset between TOC1 and TOC3.

Routine 600 begins at step 610 when a TOC1 counter interrupt occurs (i.e. when the value in the timing counter matches TOC1). At step 612, hardware in the counter facility of the MCU 210 automatically copies a predetermined bit of an internal register OC1D to the output port which controls the motor power lead. Accordingly, when the TOC1 interrupt occurs, the motor power lead is enabled or disabled according to how OC1D was set by routine 700. Step 612 is shown disconnected from the program flow because it is performed automatically by hardware as a result of the successful TOC1 comparison. At step 614 the TOC3 interrupt, which toggles the motor power lead, is scheduled by adding $100 (hexadecimal 100, which equals decimal 256) to the value stored in TOC3. At step 614, the TOC1 interrupt defining the end of the PWM cycle, and the beginning of the next cycle, is scheduled by adding $100 to the value stored in TOC1. At step 618, an internal flag, indicating that a TOC1 interrupt has occurred, is cleared to enable processing of subsequent TOC1 interrupts. At step 620, counter hardware toggles the motor power lead when the timing counter matches the value stored in TOC3. Step 620 is shown disconnected from the program flow because it is performed automatically by hardware as a result of the successful TOC3 comparison. At step 622, execution returns to the program steps being executed before receipt of the counter interrupt.

In less abstract terms, if the duty cycle selected by routine 700 is greater than 50 percent, then the motor power supply is initially enabled by the TOC1 interrupt in step 612 and disabled (toggled) by the TOC3 interrupt in step 620. If the duty cycle selected by routine 700 is less than 50 percent, however, then the motor power supply is initially disabled by the TOC1 interrupt in step 612 and enabled (toggled) by the TOC3 interrupt in step 620.

It should be noted that $100 represents the total number of timing counter cycles in each PWM cycle. Thus, the PWM duty cycle is the ratio of the number of timing counter cycles during which the motor power lead is "on" to the number of total cycles, i.e $100, and the number of "on" cycles is determined by the offset between the values stored in TOC1 and TOC3. Since routine 600 adds the same number ($100) of cycles to TOC1 and TOC3 during each interrupt service event, routine 600 has no effect on the offset between TOC1 and TOC3. Routine 600 merely maintains whatever PWM duty cycle is established by routine 700.

Figure 7B:
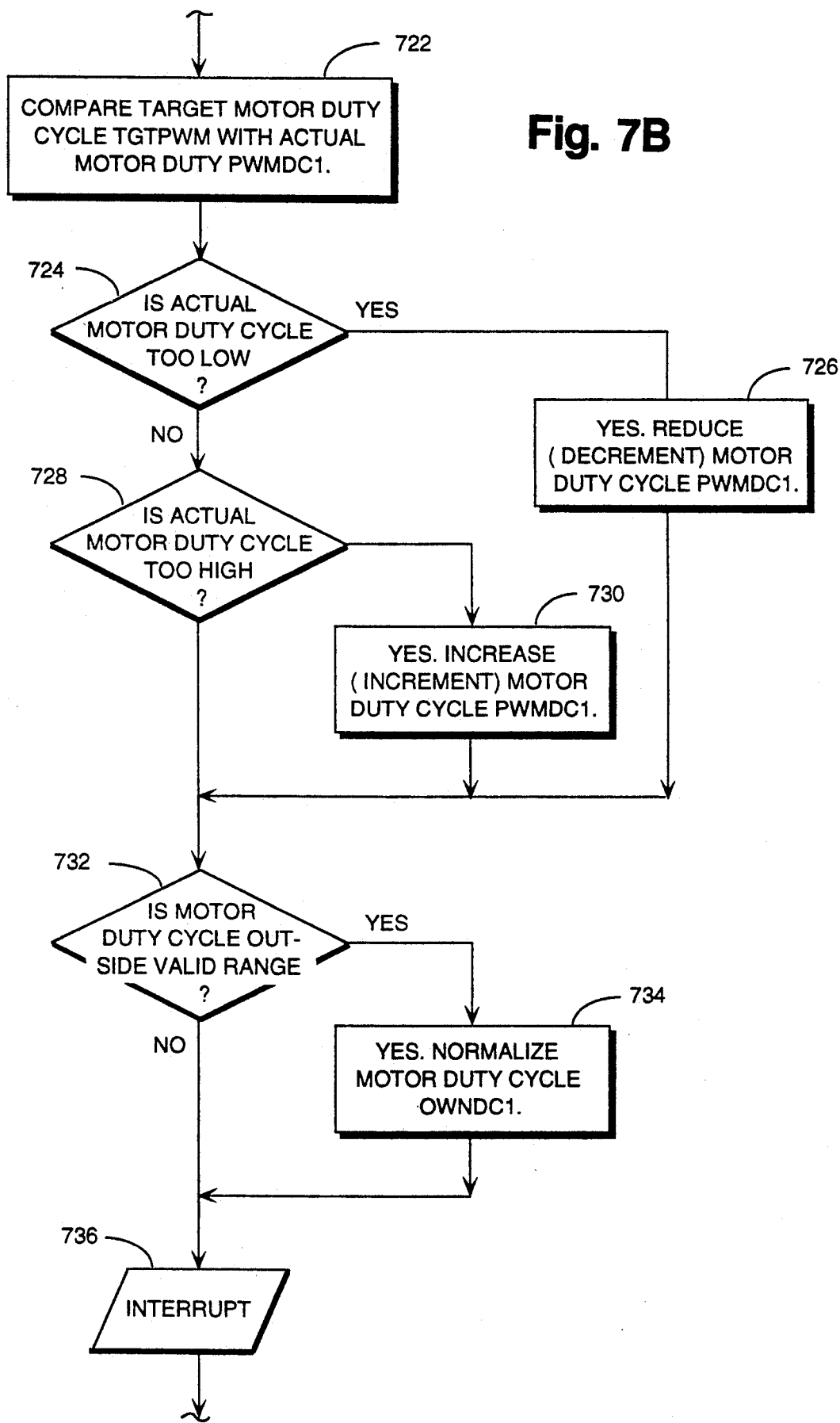
Figure 7C:
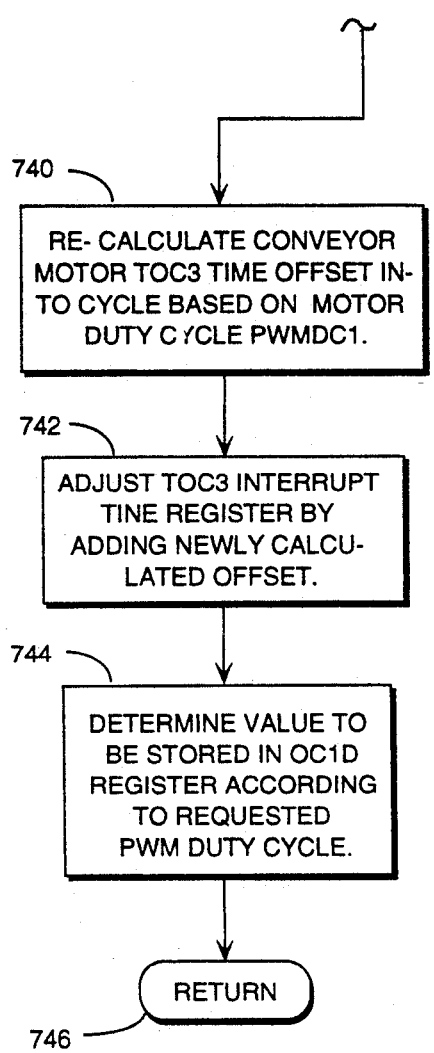

FIG. 7 is a flow chart of the motor control periodic PWM duty cycle adjustment routine 700. Routine 700 is scheduled for execution every 4.096 ms. Although the exact execution of routine 700 is not critical, it should execute substantially less frequently than PWM interrupt service routine 600. Since adjustment of the actual PWM duty cycle occurs only once each time routine 700 is executed, it must execute frequently to provide sufficiently responsive speed control.

The duty cycle adjustment routine 700 begins at step 710. At step 712, the target motor shaft position for the current time is calculated by adding a previously calculated motor shaft position increment (see routine 800, FIG. 8) to the present motor shaft position. Since the product cook time selected by the user may vary over a wide range, the conveyor motor speed must also be variable over a wide range. Accordingly, it is typical that the motor shaft position increment will not be an integer. Further, because the duty cycle adjustment routine executes relatively frequently, it is also typical that the desired increment may be a small fraction of one-quarter turn. Accordingly, both the shaft increment and the target shaft position are preferably stored and calculated with high precision in order to avoid the significant errors which would occur if only integer increments were accumulated. For example, the target shaft position is preferably stored with 40 bits (five bytes) of precision to properly accumulate fractional shaft position increments.

At step 714, the motor shaft position error is calculated by subtracting the actual motor shaft position from the target motor shaft position. At step 716, the motor shaft position error is inspected to determine whether the resulting PWM duty cycle called for would exceed 100 percent. A requested duty cycle exceeding 100 percent indicates that the motor is not able to run fast enough to maintain the target shaft position. In effect, this condition indicates that the user has selected a cook time which is shorter than the oven can provide. This condition may occur due to excess load (e.g. an excess amount of product to be cooked has been placed on the conveyor) or it may be due to low line voltage. If this condition were permitted to continue, then the target shaft position would advance so far beyond the actual shaft position that when the situation is corrected, there would be an unacceptable lag before the target shaft position is reached.

Accordingly, if the requested duty cycle exceeds 100 percent, then execution branches to step 718, where the requested cooking time is adjusted upward to a value which the oven can achieve, and the motor shaft position increment is recalculated based on the adjusted cooking time. The adjusted cooking time is presented to the user on the display so that the user is aware that the adjustment has occurred. Facilities are provided in other portions of the control software to determine, once an adjustment has occurred, whether the condition which produced the excessive requested duty cycle has been corrected, and if so, to readjust the requested cook time to the value originally selected by the user. At step 720, the target motor PWM duty cycle variable TGTPWM is calculated as a value proportional to the shaft position error.

In the preferred embodiment of the invention, the duty cycle variables are stored as one-byte integers, representing the duty cycle fraction (which may range from 0.0 to 1.0) multiplied or scaled by 256. Thus, each incremental unit of the duty cycle fraction represents a change of 1/256 of the full range of the duty cycle. When the duty cycle is 0.0 (stored as 0), then the motor power lead is always disabled, and when the duty cycle is 1.0 (stored as 255), the motor power lead is always enabled. In addition, the duty cycle variables are normalized so that when the shaft position error is zero, the calculated duty cycle is 0.5 (stored as 128). Since the period of PWM interrupt service routine 700 is 256 cycles, this duty cycle representation may be used directly as the offset between the values stored in TOC1 and TOC3 without further scaling.

In step 722, the target motor duty cycle TGTPWM is compared with the actual motor duty cycle PWMDC1. In step 724, if the actual motor duty cycle is greater than the target duty cycle, then execution branches to step 726, and the actual motor duty cycle PWMDC1 is decremented by 1. In step 728, if the actual motor duty cycle is less than the target duty cycle, then execution branches to step 730, and the actual motor duty cycle PWMDC1 is incremented by 1. If the branches at step 726 and 728 fail, then the actual duty cycle is equal to the target duty cycle, and no changes to the actual duty cycle need be made. Thus, the actual motor duty cycle PWMDC1 can change in the direction of the target duty cycle TGTPWM by 1 (i.e. 1/256 of the full duty cycle range) each time the PWM adjustment routine 700 is executed. In step 732, the actual motor duty cycle PWMDC1 is checked to determine if it has been adjusted above a maximum value, and if so, execution branches to step 734, where PWMDC1 is reset to that maximum value. Preferably the maximum value selected 1s 254, one less than the figure of 255 which is the actual top of the range of 256 values extending from 0 to 255, in order to provide a guard band of 1 and thus prevent an increment from wrapping around from 255 to 0.

At step 736, a wait-for-interrupt instruction is executed which causes the MCU 210 to stop executing instructions until an interrupt is requested from any interrupt source. An interrupt request, which may originate from the shaft-position sensor 150, the MCU counter facility, or another source, is shown as step 738. Step 738 is shown disconnected from the program flow because it occurs asynchronously as the result of something other than instruction execution.

Once the interrupt request of step 738 has occurred, execution continues at step 740. As described previously with respect to FIG. 6, each PWM cycle (defined as the time between successive TOC1 interrupts) is divided by the TOC3 interrupt into a first part and a second part. If the requested PWM duty cycle exceeds 50 percent, then the motor is enabled during the first part and disabled during the second part. If the requested PWM duty cycle is less than 50 percent, then the motor is disabled during the first part and enabled during the second part. In step 740, the offset into the PWM cycle at which the TOC3 interrupt should occur is recalculated. This calculation uses the newly obtained present motor duty cycle PWMDC1. At step 742, a new value for the first part of the PWM cycle is calculated for timer register TOC3 by adding the offset to the TOC1 value for the beginning of the current PWM cycle, and this newly calculated time is stored in TOC3. At step 744, the internal timer register OC1D is updated according to whether the requested duty cycle is greater than or less than 50 percent. The data stored in OC1D is automatically copied by the counter hardware to the output port which controls the motor power lead whenever the TOC1 interrupt occurs. At step 746, control is returned to the calling routine, i.e. the still-unfinished routine which originally called up subroutine 700.

Figure 8:
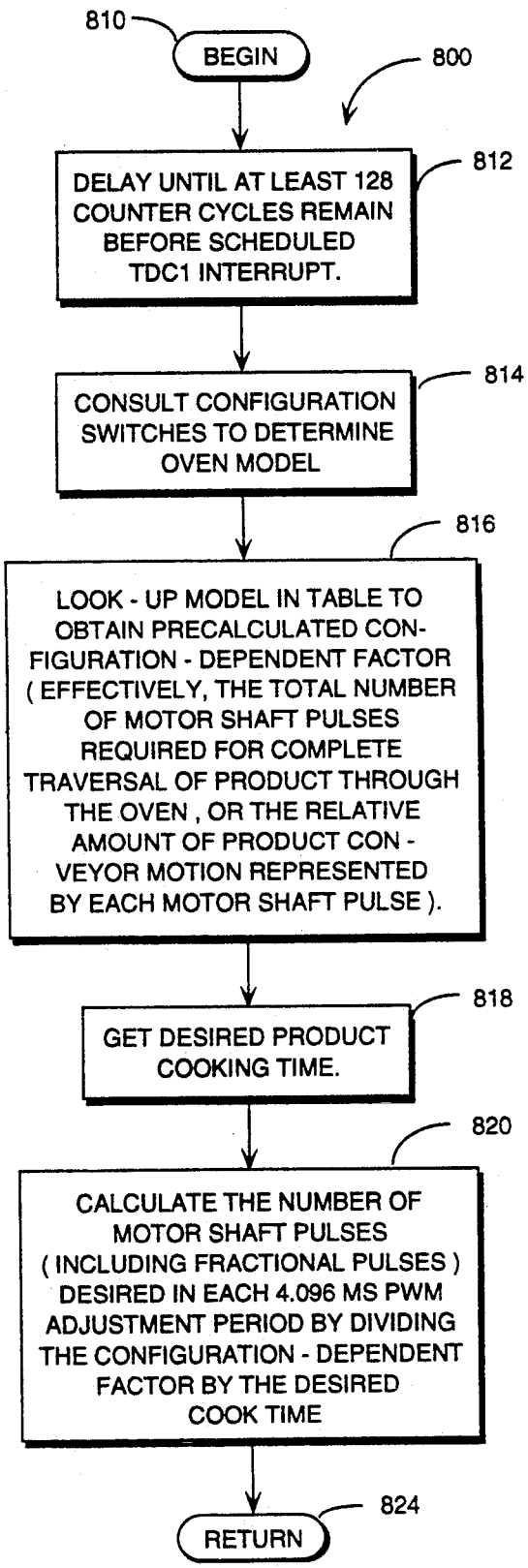
FIG. 8 is a flow-chart of a subroutine for calculating the desired motor shaft position increment used with the duty cycle adjustment route of FIG. 7.

FIG. 8 is a flow-chart of a subroutine 800 for calculating the motor shaft position increment. Subroutine 800 begins at step 810. Routine 800 uses certain instructions which require a large number of MCU 210 instruction cycles to complete. During the execution of these instructions, any interrupt requests which may occur are held pending until instruction execution is complete. It is especially undesirable to delay servicing of a TOC1 interrupt during execution of these instructions because such a delay would disrupt the constant PWM cycle period. In order to prevent a TOC1 interrupt from occurring during one of these instructions, further execution of routine 800 is inhibited until it can be guaranteed that no TOC1 interrupt requests will arrive during the routine. In step 812, the TOC1 counter timing register is examined to ensure that at least 128 counter cycles remain before the next TOC1 interrupt request occurs. If at least 128 cycles remain, then execution of routine 800 continues at step 814. If, however, less than 128 cycles remain, then execution loops in step 812 until the next TOC1 interrupt occurs. Upon return from the TOC1 interrupt service routine, the TOC1 counter timing register will contain a value substantially larger than 128, and execution of routine 800 continues at step 814.

In step 814, the MCU 210 reads an I/O port to obtain the state of configuration switches 230 (FIGS. 2-3), which indicate the particular oven model with which the control 100 is being used. Because various oven models may have substantially different motor gearing, conveyor linkage gearing, conveyor lengths, heating zone quantities, heating element quantities, and temperature-sensing- device quantities, it is desirable for proper control to recognize a variety of different oven configurations. The configuration switches 230 permit a single version of control program software to detect and accommodate such a variety of configurations.

In step 816, the model identification information read from the configuration steps is used to consult a table to obtain a precalculated configuration-dependent factor used for motor speed calculations. This factor effectively represents the total number of motor shaft pulses required for complete traversal of a product through the oven heating zone.

In step 818, the current user-selected product cooking time is obtained from storage. In step 820, the motor shaft position increment value is calculated by dividing the configuration-dependent factor obtained from the configuration switches 230 by the desired product cooking time. The shaft position increment represents the number of motor shaft pulses, including fractions of a pulse, which would be expected to occur during one 4.096 ms PWM adjustment period. Short cooking times require faster conveyor motor speeds, and therefore result in higher shaft position increments. Long cooking times require slower conveyor motor speeds, and therefore result in a lower shaft position increment. In step 820, execution returns to the calling routine.

The control software is also responsible for accurately maintaining the temperature in each heating zone according to the user's temperature selections. The MCU 210 receives from A-D converter 212 a 12-bit digitized value for each of the temperature sensors 172, 174, 176, and 178. Each value represents a voltage output from the respective sensor which varies with the temperature sensed thereby. In the preferred embodiment of the invention, the temperature sensors are thermocouples, and the voltage measurement from each thermocouple is independently converted to temperature by the MCU 210 and appropriate control software. Each voltage measurement is converted to digital form by A-D converter 212, and each digitized voltage is scaled and summed With an appropriate Value derived from the measured ambient temperature to produce a measured temperature for each thermocouple. This "cold-junction compensation" activity is performed solely by the MCU 210 under software control. In conventional thermocouple temperature measurement apparatus, the measured ambient temperature would be converted to a voltage inversely proportional to the thermocouple output and would be summed with the thermocouple outputs in the analog domain. By performing these tasks in the digital domain, the present invention minimizes hardware complexity and simplifies calibration procedures.

Typical existing ovens use high hysteresis controls which enable the heater power supplies when the measured temperature is below a first predetermined temperature, and disable the heater power supplies When the measured temperature exceeds a second predetermined temperature. Because these predetermined temperatures are typically several degrees apart, and because thermal inertia in the oven causes substantial delays between the input of energy to the heaters and a resulting measurable change in temperature, even if the average temperature is correct the prior art control devices produce relatively large temperature swings in the oven. This results in inconsistent cooking rates which affects product quality. In addition, because the heater elements themselves are subject to even greater temperature excursions than the oven chamber, the life of the heater elements is diminished.

The control device 100 according to the present invention uses pulse-width-modulation (PWM) of the heater power supply leads in order to provide an average power input to each heater element which is as close as possible to that required to maintain the desired temperature. The PWM technique periodically and rapidly enables and disables the heater power supply, varying the duty cycle as a function of the error between the measured temperature and the desired temperature in order to control the average power supplied.

The PWM process thus continuously controls the heater power supplies by making duty-cycle corrections whenever measured temperatures deviate from the desired values. In contrast, prior-art oven controls take corrective action only when measured temperatures exceed predetermined temperature limits; and whenever the measured temperature is within those limits (the hysteresis range) no correction occurs even if the temperature is substantially above or below the desired value. Because the heater power supply is rapidly enabled and disabled without waiting for specific temperature thresholds to be reached, the control 100 maintains a nearly correct average heater power input at all times, without undergoing the wide temperature excursions associated with prior-art controls.

Figure 9A:
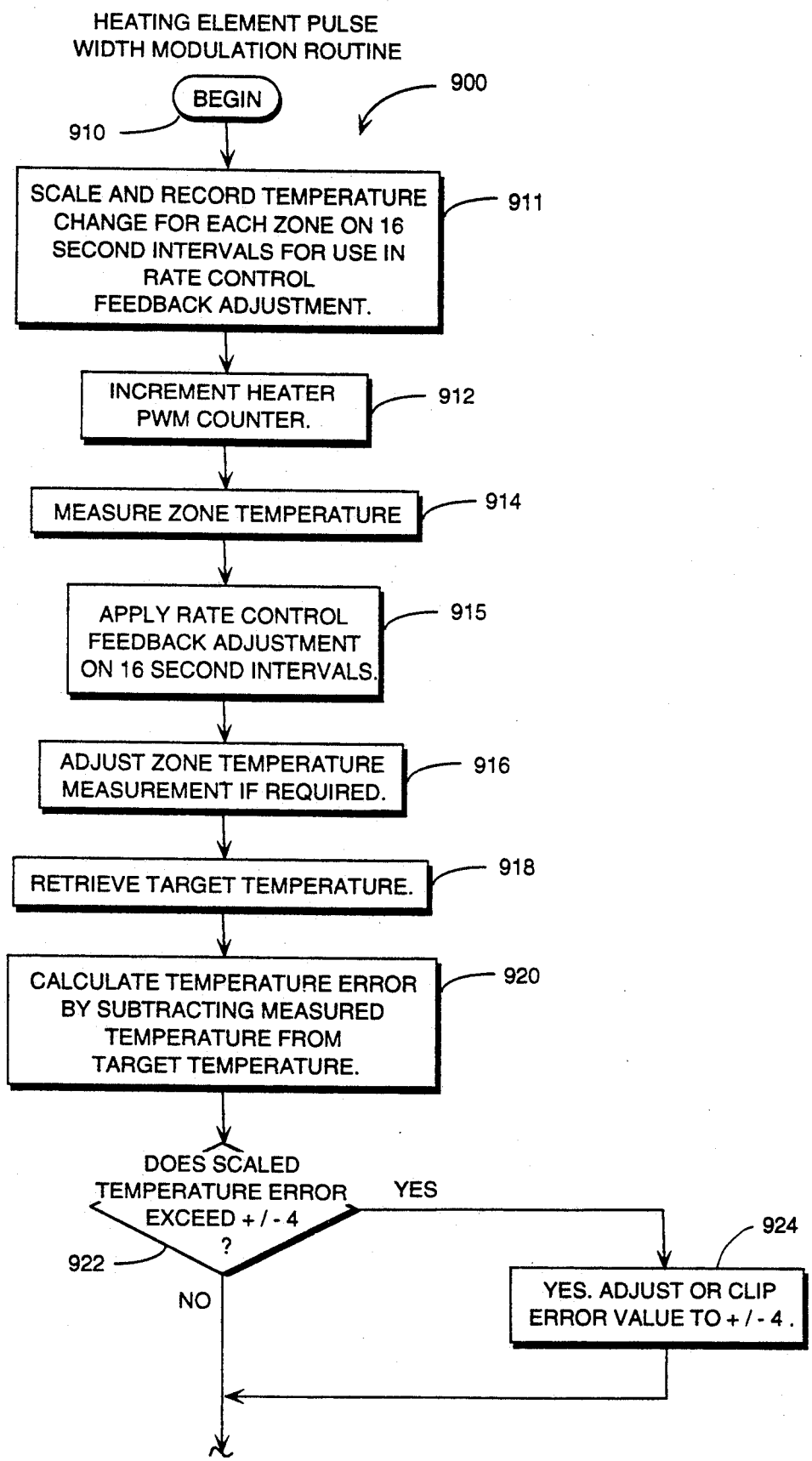
FIGS. 9A to 9B are a flow-chart of a heating element pulse-width-modulation routine used in the oven control of FIGS. 1-4.
Figure 9B:
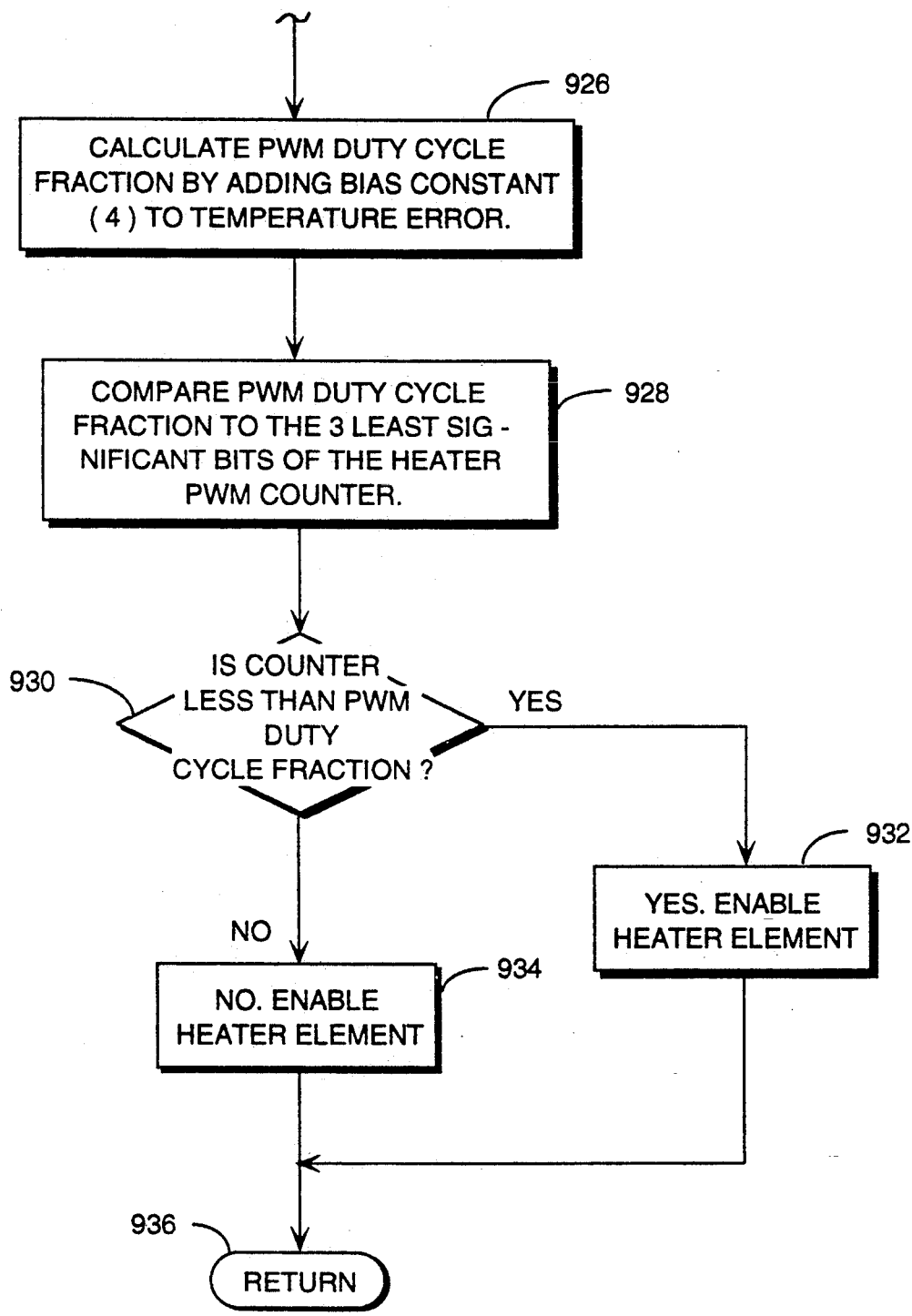

FIG. 9 is a flow-chart of a routine 900 for providing pulse-width-modulation of the heating element power supplies. The routine 900 begins at step 910. In the preferred embodiment of the invention, the routine is scheduled for execution every 8.192 ms. The exact frequency of operation of routine 900 is not critical, however, provided that it remains consistent; the routine could be scheduled to execute at any period which reasonably approximates one-half of an AC power supply cycle.

At step 911, temperature change information for each zone is recorded for subsequent use in rate control feedback adjustment in step 915. The temperature change information is recorded only at 16-second intervals. Accordingly a timing variable is checked to determine whether a 16-second interval has elapsed since the temperature change information was previously recorded, and if not, recording of temperature change information is inhibited.

The control software maintains in storage a heater element PWM counter variable, of which the least significant three bits are used. This counter represents the current segment of time within a complete cycle of the temperature PWM period. At step 912, the counter is incremented by one. At step 914, the temperature in the heating zone being controlled is determined by obtaining a 12-bit value from the A-D converter 212 (FIG. 3). This value represents a voltage obtained from a temperature sensor serving the relevant oven heating zone. In the preferred embodiment of the invention, the temperature sensor is a thermocouple, and the digitized voltage value obtained from the A-D converter 212 is converted to a temperature using adding a cold-junction compensation offset derived from the measured ambient temperature and scaled. This conversion activity is performed by MCU 210 under software control. However, other types of temperature sensors could also be used, and different conversions (or, for some sensors, no conversions) may be required.

The control 100 provides rate control feedback to minimize the effects of thermal lag. Without the rate control feedback, relatively large temperature overshoot would occur, particularly when the use of the oven is started from a "cold" condition. As a result of the thermal lag, even after completely disabling the heater power the measured temperature continues to increase for many seconds. In step 915, a rate control feedback adjustment is applied to the measured temperature. At 16 second intervals, the temperature change which has occurred in each zone during that interval is scaled and recorded (see step 911). On the same intervals, a rate factor is calculated and added to the measured temperature for each zone. A relatively large rate of temperature increase will cause the measured temperature in a zone to appear higher than the actual temperature, and will therefore cause an early reduction in heater power. Similarly, a large rate of temperature decrease will cause the measured temperature in a zone to appear lower then the actual temperature, and will therefore cause an early increase in heater power.

At step 916, other adjustments are made to the temperature measurement, if required. For example, if the temperature sensor is a thermocouple, a calibration value may be applied to the temperature measurement. Each of the thermocouple amplifiers contributes both gain and offset errors. The A-D reference voltage introduces a measurement error which is indistinguishable from a gain error. The ambient temperature sensor can also be expected to have gain and offset errors. In the implementation described herein, the offset error can be assumed to be insignificant.

The control 100 is instructed to enter a calibration mode by setting the six configuration switches 230 to a predetermined calibration request pattern and enabling key switch 344. Calibration of the thermocouple inputs is accomplished by applying a known voltage to the thermocouple input terminals, displaying the voltage, and adjusting the internal gain and offset values used to calculate the displayed voltage until it matches the known voltage. These adjusted values are then used to calculate temperature. Calibration of the ambient temperature sensor is accomplished by measuring the ambient temperature with an external instrument, displaying the temperature measured by the internal sensor, and adjusting an internal calibration factor until the temperature calculated therewith matches the externally measured temperature.

Calibration values are preferably determined when the oven is installed or at some other time prior to use, and are preferably stored in EEPROM 234 (FIGS. 2-3) to avoid loss of the values when electrical power is not available to the control 100. If multiple temperature sensors are provided in a heating zone, the temperature measurement may be adjusted by calculating the mean (or another suitable average value) of the temperatures measured by those sensors. If a temperature sensor is determined to be defective, the incorrect (or unavailable) temperature measurement for which that sensor is responsible may be adjusted, as explained below, by substituting in its place a temperature calculated as a function of measurements from other nearby sensors.

At step 918, the target temperature established by the user for the current zone is retrieved from storage. At step 920, the temperature error is calculated by subtracting the measured temperature from the target temperature.

At step 922, the temperature error is scaled and then compared to determine whether it exceeds +/−4. If it does, then at step 924 the error value is adjusted or "clipped" to a value within that range in order to prevent overly corrections from being made in any one step.

In the preferred embodiment of the invention, the PWM duty cycle fraction is stored as an integer representing the duty cycle fraction (which may range from 0.0 to 1.0) multiplied or scaled by 8. Thus, each incremental unit of the duty cycle fraction represents a change of ⅛ or 0.125 of the full range of the duty cycle. When the duty cycle is 0.0 (stored as 0), then the heater power supply leads are always disabled, and when the duty cycle is 1.0 (stored as 8), the heater power leads are always enabled. In addition, the duty cycle fraction is normalized so that when the temperature error is zero, the calculated duty cycle is 0.5 (stored as 4). Accordingly, at step 926 a PWM duty cycle fraction is calculated by adding a normalizing constant of 4 to the temperature error value.

Since the heater PWM counter variable is periodically incremented (see step 912) and only the three least-significant bits are considered, the counter variable continuously progresses through eight steps. The PWM duty cycle fraction determines the number of those steps during which the heater power supply is enabled. In step 928, the PWM duty cycle fraction is compared to the three least significant bits of the heater PWM counter variable. In step 930, if the counter variable is less than the PWM duty cycle fraction, then a branch is taken to step 932, in which the heater element power supply lead is enabled. If the counter variable is greater than the PWM duty cycle fraction, then at step 934, the heater element power supply lead is disabled. At step 936, control returns to the calling program.

The software of control 100 provides facilities for detecting faults and errors, reporting them to the user, and taking appropriate corrective action. Whenever possible, therefore, the control 100 provides graceful degradation of oven performance despite such faults and errors. Thus several routines contain error detection facilities, the control presents an error indicium, such as a code or message, in the display, to alert the user to fault or error conditions, and the control software maintains in storage a data structure for recording the error status of the control 100. Each error detection facility may update the error status data structure. The software controlling the display may interrogate the data structure to present to the user one or more appropriate error indicia.

The control 100 detects and reports to the user a high ambient temperature condition, preferably defined as a temperature exceeding 185 degrees F., which is detected by ambient temperature sensor 322 (FIGS. 2-3). The control 100 preferably disables all heater elements when such a condition is detected.

The control 100 detects and reports to the user a conveyor motor drive runaway condition when it determines that the motor speed control routines 500-800 call for a motor PWM duty cycle less then 0. This occurs, for example, if the motor drive transistor 304 (FIG. 3) is shorted. In such a case, the motor speed control routines would attempt to reduce the motor PWM duty cycle, but the motor would nevertheless continue to operate at the highest possible speed. PWM duty cycle reductions would then continue until the PWM duty cycle decreases below zero, at which point the runaway error condition would be detected.

The control 100 detects and reports to the user an error when no pulses are detected from the motor shaft position sensor for 15 seconds. Such a fault may occur if the motor transistor fails open, the wiring to the motor fails, the motor itself fails or is stalled, or the shaft position sensor fails.

The control 100 detects and reports to the use an error when the cooking time requested by the user is so short that the product movement conveyor motor cannot achieve the requested speed. This condition is detected when the motor speed control routines call for a duty cycle which exceeds 1. When this occurs, the control degrades gracefully by resetting the cooking time to the fastest possible, displaying that time, and also displaying an appropriate error message. The user may cancel the error message by selecting a cooking time within the range of speeds of which the conveyor is capable.

The control 100 also detects and reports several errors for each heating zone. A first heater failure error is detected When the heater element power supply is continuously enabled for more than 60 seconds but the measured temperature is decreasing and the difference between the measured temperature and the selected temperature exceeds 25 degrees F. A second heater failure error is detected when the heater element power supply is continuously enabled for more than 30 seconds and the measured temperature does not exceed 25 degrees F. above the measured ambient temperature. This second error may indicate that a thermocouple has failed. A heater runaway error is detected when the heater element power supply is continuously disabled for more than 60 seconds but the measured temperature is above 910 degrees F., is increasing, and is at least 25 degrees greater than the selected temperature.

The above-described preferred embodiment is merely one example of how the invention may be carried out. Other ways may also be possible, and are within the scope of the following claims defining the invention.

What is claimed is:

1. A control device for an oven having at least one cooking region, at least one heating means for said cooking region, and means for transporting a product through said cooking region, said control device comprising:
   means for receiving from a user a plurality of sets of desired operating parameters, each such set including at least one parameter related to a temperature produced by said heating means and at least one other parameter related to the speed of said transporting means;
   means for storing said sets of parameters;
   means for retrieving a selectable one of said sets of parameters upon request of said user;
   means for controlling at least said heating means and said transporting means according to said retrieved set of parameters; and
   means responsive to said parameter related to the speed of said transporting means for adjusting controlling said product transport means to maintain the product within the cooking region for a time corresponding to said parameter related to the transporting means speed.

2. A control device for an oven having at least one cooking region, at least one heating means for said cooking region, and means for transporting a product through said cooking region, said control device comprising:
   means for receiving from a user a plurality of sets of desired operating parameters, each such set including at least one parameter related to a temperature produced by said heating means and at least one other parameter related to a cooking time for said product;
   means for storing said sets of parameters;
   means for retrieving a selectable one of said set of parameters upon request of said user; and
   means for controlling at least said heating means and said transporting means according to said retrieved set of parameters.

3. The control device of claim 2 wherein:
   said cooking region comprises a plurality of zones;
   each of said zones has at least one respective zone heating means controllable independently of the other said zone heating means; and
   each set of desired operating parameters comprises a respective desired temperature selection to be produced in each said zone by said respective heating means of said zone.

4. The control device of claim 2 wherein said means for controlling said oven comprises means responsive to said desired temperature selections for controlling a temperature produced by said heating means.

5. The control device of claim 2 wherein said means for controlling said oven comprises means responsive to said desired cooking time parameter for controlling said product transport means to maintain the product within the cooking region for a time corresponding to said parameter related to said product cooking time.

6. The control device of claim 2 wherein said means for controlling said oven comprises means for receiving from a user a desired product cooking time and means for controlling said product transport means to maintain the product within the cooking region for a time substantially equal to said desired product cooking time.

7. The control device of claim 2 further comprising keyboard means operable by said user to selectably request retrieval of each of said sets of desired operating parameters from said storage means.

8. The control device of claim 7 wherein said keyboard means comprises a plurality of user-operable keys, each key being associated with a respective one of said sets of desired operating parameters for requesting retrieval and use of said set of desired operating parameters when said key is operated.

9. The control device of claim 2 further comprising override means for adjusting the temporary use at least one of said operating parameters.

10. The control device of claim 2 wherein electrical power is provided to said storage means during operation, and said storage means is adapted to retain said sets of desired operating parameters despite interruptions in said electrical power.

11. A control device for an oven having a cooking region and means for transporting a product through said cooking region, said control device comprising:
 means for receiving from a user a desired cooking time selection;
 means responsive said desired cooking time selection for controlling said product transport means to maintain the product within said cooking region for a time substantially equal to said cooking time selection;
 said operating speed controlling means having:
 means for measuring the operating speed of said product transport means;
 means for supplying motive energy to said product transport means; and
 means responsive to said operating speed measurement means and said desired cooking time selection for adjusting the amount of said motive energy supplied to said product transport means to produce a cooking time closely approximating said desired cooking time selection.

12. The control device of claim 11 wherein said energy supply adjustment means pulse-width-modulates said motive energy supplied to said product transport means.

13. The control device of claim 12 wherein said energy supply adjustment means comprises:
 first timing means for repeatedly determining a constant time period;
 second timing means for determining a variable time period beginning when said constant time period begins and ending before said constant time period ends;
 means for enabling or disabling said energy supply at the beginning of said variable time period and disabling or enabling said energy supply at the end of said variable time period; and
 means responsive to said product transport speed measuring means and said desired product cooking time selection for adjusting said variable time period to control the average amount of energy supplied to said product transport means and thereby control the cooking time achieved by said product transport means.

14. The control device of claim 13 further comprising:
 product transport drive means;
 means for sensing the position of said product transport drive means;
 means for responsive said desired product cooking time for calculating a desired position of said product transport drive means;
 means for producing a drive position error value indicative of the difference between said measured drive position and said desired drive position; and
 means responsive to said drive position error value for controlling said ratio of the durations of said variable time interval and said constant time period.

15. The control device of claim 14 further comprising means for calculating a drive transport energy supply target duty cycle proportional to said drive position error value; and means for incrementally adjusting said ratio to approach said target duty cycle.

16. The control device of claim 11 wherein said energy supply adjustment means comprises:
 repeatedly operating means for enabling said energy supply means for a first time period and for disabling said energy supply means for a second time period; and
 means responsive to said product transport speed measuring means for adjusting the ratio of the durations of said first and second time periods.

17. The control device of claim 11 wherein:
 said product transport means is capable of achieving product cooking times over a variable but limited range; and
 said device further comprises means for detecting a desired cooking time selection which exceeds said range, and means responsive to said detecting means for reporting an error to said user.

* * * * *